United States Patent
Tonomura et al.

(12) 
(10) Patent No.: US 6,425,248 B1
(45) Date of Patent: Jul. 30, 2002

(54) SOLAR POWER GENERATION ADMINISTRATION SYSTEM, AND SOLAR POWER GENERATION ADMINISTRATION METHOD TO PROVIDE USEFUL INFORMATION TO USER

(75) Inventors: Yoshifumi Tonomura, Sakurai; Katsuyuki Konishi, Kashihara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/956,134

(22) Filed: Sep. 20, 2001

(30) Foreign Application Priority Data

Sep. 21, 2000 (JP) ........................................ 2000-286493

(51) Int. Cl.[7] ................................................. B60K 6/00
(52) U.S. Cl. .................................... 60/641.8; 60/641.15
(58) Field of Search ............................. 60/641.8, 641.15

(56) References Cited

U.S. PATENT DOCUMENTS 4,277,845 A * 7/1981 Smith et al. .................. 455/52
4,685,149 A * 8/1987 Smith et al. .................. 455/56

FOREIGN PATENT DOCUMENTS

| JP | 7-322363 | 12/1995 |
| JP | 10-201106 | 7/1998 |
| JP | 11-89093 | 3/1999 |
| JP | 11-206038 | 7/1999 |

* cited by examiner

Primary Examiner—Hoang Nguyen
(74) Attorney, Agent, or Firm—Nixon & Vanderhye P.C.

(57) ABSTRACT

A method of providing a user who has installed a solar power generator with appropriate information, including the steps of receiving data of the quantity of generated power and quantity of power draw from a solar power generator connected to a network, calculating the quantity of buy power and quantity of sell power on a time zone basis, reading out a rate table of buy power and sell power, calculating the electric power charge for buy power and sell power classified into contract types, determining the type of contract that is most economical as to the value to be paid to a power company, calculated by subtracting the amount to be received for sell power from the amount to be paid for buy power, and producing appropriate information based on the determined contract type and calculated amount of payment.

46 Claims, 56 Drawing Sheets

FIG.6

| COMMUNICATION HEADER |
|---|
| USER ID |
| HOURLY GENERATED POWER QUANTITY DATA |
| HOURLY POWER DRAW QUANTITY DATA |
| HOURLY BUY POWER QUANTITY DATA |
| HOURLY SELL POWER QUANTITY DATA |
| SHORT-CIRCUIT CURRENT DATA |
| MISCELLANEOUS |

FIG.7

| REGISTRATION DATA | USER ID | 1001001 | 1001002 | ... |
|---|---|---|---|---|
| | AREA ID | 102 | 103 | ... |
| | SOLAR CELL ARRAY TYPE | A098 | A88 | ... |
| | POWER CONDITIONER TYPE | C12 | C19 | ... |
| | REGISTERED GENERATING POWER CAPACITY | 38 | 55 | ... |
| | REGISTERED LOAD CAPACITY | 50 | 60 | ... |
| | LAST TIME OF RECEIVING DATA | 13:00 | 13:00 | ... |
| GENERATED POWER (PAST RECORD) | LAST RECEIVED GENERATED POWER | *** | *** | ... |
| | GENERATED POWER (DAILY ACCUMULATION) | *** | *** | ... |
| | GENERATED POWER (MONTHLY ACCUMULATION) | *** | *** | ... |
| ERROR DETECTION | AVERAGE OF GENERATED POWER IN AREA | *** | *** | ... |
| ERROR DETECTION (CALCULATION) | QUANTITY OF SOLAR INSOLATION IN AREA | *** | *** | ... |
| | CALCULABLE GENERATED POWER IN AREA | *** | *** | ... |
| ERROR DETECTION (SHORT-CIRCUIT) | RECEIVED SHORT-CIRCUIT CURRENT VALUE | *** | *** | ... |
| | AVERAGE OF SHORT-CIRCUIT CURRENT IN AREA | *** | *** | ... |
| POWER DRAW (PAST RECORD) | LAST RECEIVED POWER DRAW | *** | *** | ... |
| | POWER DRAW (DAILY ACCUMULATION) | *** | *** | ... |
| | POWER DRAW (MONTHLY ACCUMULATION) | *** | *** | ... |
| PRIVATE POWER GENERATION RATIO (PAST RECORD) | PRIVATE POWER GENERATION RATIO (MONTHLY AVERAGE) | *** | *** | ... |
| | AVERAGE OF PRIVATE POWER GENERATION RATIO IN AREA (MONTHLY AVERAGE) | *** | *** | ... |
| | PRIVATE POWER GENERATION RATIO RANKING IN AREA | *** | *** | ... |
| SELL POWER (PAST RECORD) | LAST RECEIVED SELL POWER | *** | *** | ... |
| | SELL POWER (DAILY ACCUMULATION) | *** | *** | ... |
| | SELL POWER (MONTHLY ACCUMULATION) | *** | *** | ... |
| BUY POWER (PAST RECORD) | LAST RECEIVED BUY POWER | *** | *** | ... |
| | BUY POWER (DAILY ACCUMULATION) | *** | *** | ... |
| | BUY POWER (MONTHLY ACCUMULATION) | *** | *** | ... |
| TIME ZONE BASIS GENERATED POWER (MONTHLY ACCUMULATION) | DURING 0th HOUR (0:00-0:59) | *** | *** | ... |
| | DURING FIRST HOUR (1:00-1:59) | *** | *** | ... |
| | ... | *** | *** | ... |
| | DURING 23rd HOUR (23:00-23:59) | *** | *** | ... |
| TIME ZONE BASIS POWER DRAW (MONTHLY ACCUMULATION) | DURING 0th HOUR (0:00-0:59) | *** | *** | ... |
| | DURING FIRST HOUR (1:00-1:59) | *** | *** | ... |
| | ... | *** | *** | ... |
| | DURING 23rd HOUR (23:00-23:59) | *** | *** | ... |
| TIME ZONE BASIS BUY POWER (MONTHLY ACCUMULATION) | DURING 0th HOUR (0:00-0:59) | *** | *** | ... |
| | DURING FIRST HOUR (1:00-1:59) | *** | *** | ... |
| | ... | *** | *** | ... |
| | DURING 23rd HOUR (23:00-23:59) | *** | *** | ... |
| TIME ZONE BASIS SELL POWER (MONTHLY ACCUMULATION) | DURING 0th HOUR (0:00-0:59) | *** | *** | ... |
| | DURING FIRST HOUR (1:00-1:59) | *** | *** | ... |
| | ... | *** | *** | ... |
| | DURING 23rd HOUR (23:00-23:59) | *** | *** | ... |
| POWER CHARGE OF COMPANY A | CONTRACT A | *** | *** | ... |
| | CONTRACT B | *** | *** | ... |
| | CONTRACT ON TIME ZONE BASIS | *** | *** | ... |
| POWER CHARGE OF COMPANY B | CONTRACT A | *** | *** | ... |
| | CONTRACT B | *** | *** | ... |
| | CONTRACT ON TIME ZONE BASIS | *** | *** | ... |
| ... | ... | *** | *** | ... |

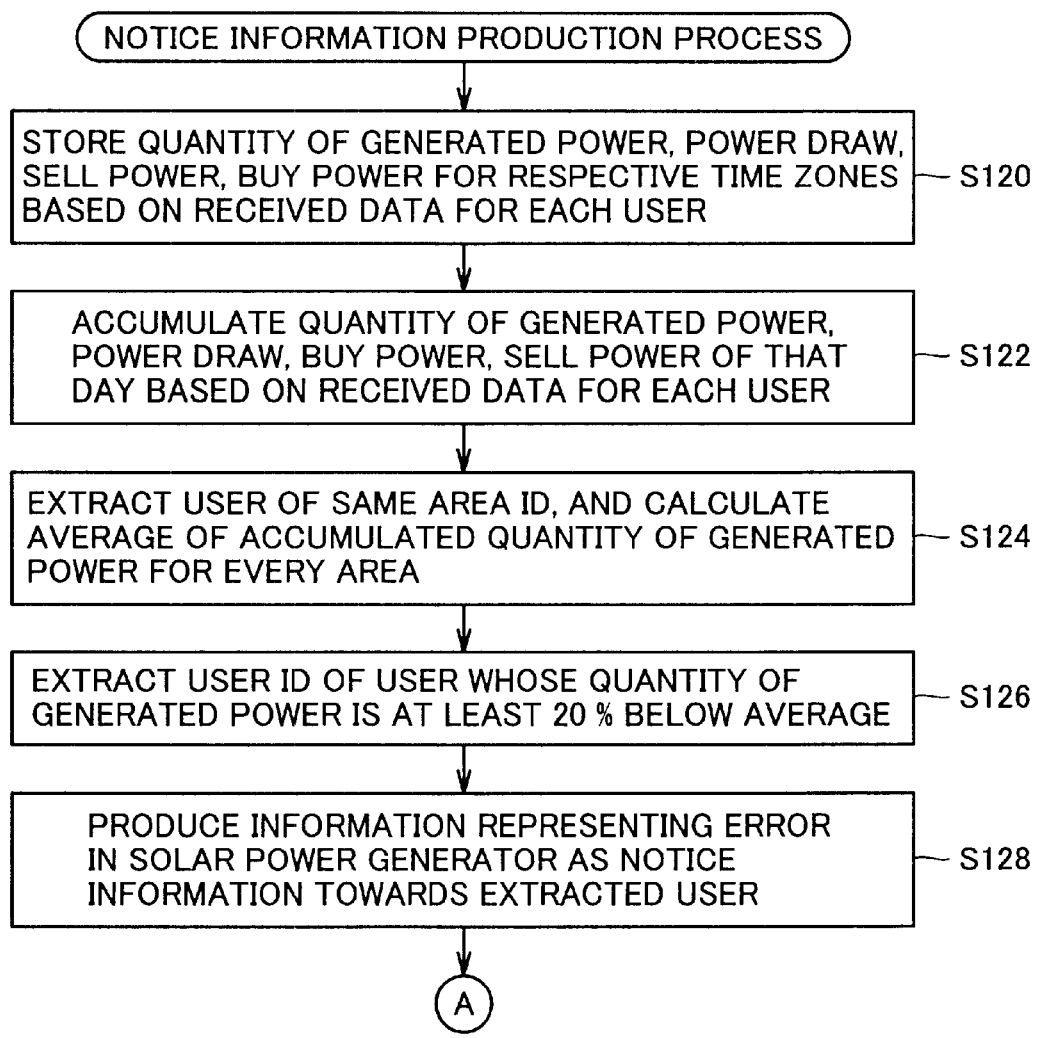

FIG.14

```
            SOLAR POWER GENERATOR MONITOR
            YEAR **** MONTH ** DAY ** TIME
  ┌─────────────────┐
  │ LINKED OPERATION │
  └─────────────────┘

┌──────────────────────────────┬──────────────────────────────────┐
  │ QUANTITY OF GENERATED POWER : *** W │ THIS MONTH'S GENERATED POWER : *** kWh │
  │ QUANTITY OF POWER DRAW      : *** W │ THIS YEAR'S GENERATED POWER  : *** kWh │
  │ QUANTITY OF BUY POWER       : *** W │ TOTAL GENERATED POWER        : *** kWh │
  │ QUANTITY OF SELL POWER      : *** W │ ($CO_2$ CONVERSION           : *** kg) │
  └──────────────────────────────┴──────────────────────────────────┘
```

FIG.15

```
            SOLAR POWER GENERATOR MONITOR
            YEAR **** MONTH ** DAY ** TIME
  ┌─────────────────┐
  │ LINKED OPERATION │
  └─────────────────┘

┌─────────────────────────────────────────────────────────────────┐
  │ NOTICE INFORMATION                                              │
  │   GENERATED POWER OF YOUR RESIDENCE IS AT LEAST 20 % LOWER THAN │
  │   THAT OF OTHER SOLAR POWER GENERATORS INSTALLED IN SAME AREA.  │
  │   PLEASE CONFIRM WHETHER THERE IS AN ERROR IN SOLAR CELL ARRAY. │
  │                                                                 │
  │   QUANTITY OF GENERATED POWER : *** W (PER REGISTERED GENERATING CAPACITY 1 kW) │
  │   AREA AVERAGE                : *** W (PER 1 kW)                │
  └─────────────────────────────────────────────────────────────────┘
```

FIG.22 QUANTITY OF GENERATED POWER (BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 0.0 | 0.0 | 0.0 | 0.0 | 0.0 | 0.0 | 0.2 | 2.6 | 9.8 | 18.3 | 25.5 | 30.9 |
| FEBRUARY | 0.0 | 0.0 | 0.0 | 0.0 | 0.0 | 0.0 | 0.2 | 2.6 | 9.9 | 18.4 | 25.8 | 31.2 |
| MARCH | 0.0 | 0.0 | 0.0 | 0.0 | 0.0 | 0.0 | 0.3 | 3.2 | 12.1 | 22.5 | 31.4 | 38.0 |
| APRIL | 0.0 | 0.0 | 0.0 | 0.0 | 0.0 | 0.0 | 0.3 | 3.3 | 12.5 | 23.2 | 32.5 | 39.3 |
| MAY | 0.0 | 0.0 | 0.0 | 0.0 | 0.0 | 0.0 | 0.3 | 3.5 | 13.5 | 25.0 | 34.9 | 42.3 |
| JUNE | 0.0 | 0.0 | 0.0 | 0.0 | 0.0 | 0.0 | 0.3 | 2.8 | 10.8 | 20.1 | 28.1 | 34.1 |
| JULY | 0.0 | 0.0 | 0.0 | 0.0 | 0.0 | 0.0 | 0.3 | 3.2 | 12.2 | 22.6 | 31.6 | 38.2 |
| AUGUST | 0.0 | 0.0 | 0.0 | 0.0 | 0.0 | 0.0 | 0.3 | 3.5 | 13.3 | 24.7 | 34.5 | 41.8 |
| SEPTEMBER | 0.0 | 0.0 | 0.0 | 0.0 | 0.0 | 0.0 | 0.3 | 3.0 | 11.4 | 21.2 | 29.7 | 35.9 |
| OCTOBER | 0.0 | 0.0 | 0.0 | 0.0 | 0.0 | 0.0 | 0.3 | 2.9 | 11.2 | 20.8 | 29.1 | 35.2 |
| NOVEMBER | 0.0 | 0.0 | 0.0 | 0.0 | 0.0 | 0.0 | 0.2 | 2.6 | 9.8 | 18.1 | 25.3 | 30.7 |
| DECEMBER | 0.0 | 0.0 | 0.0 | 0.0 | 0.0 | 0.0 | 0.2 | 2.5 | 9.6 | 17.8 | 24.9 | 30.1 |

FIG.23

QUANTITY OF GENERATED POWER (AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 32.8 | 32.5 | 30.2 | 24.8 | 16.6 | 7.5 | 2.1 | 0.0 | 0.0 | 0.0 | 0.0 | 0.0 |
| FEBRUARY | 33.1 | 32.8 | 30.5 | 25.0 | 16.8 | 7.6 | 2.1 | 0.0 | 0.0 | 0.0 | 0.0 | 0.0 |
| MARCH | 40.3 | 40.0 | 37.2 | 30.5 | 20.4 | 9.2 | 2.6 | 0.0 | 0.0 | 0.0 | 0.0 | 0.0 |
| APRIL | 41.7 | 41.4 | 38.4 | 31.6 | 21.1 | 9.5 | 2.7 | 0.0 | 0.0 | 0.0 | 0.0 | 0.0 |
| MAY | 44.8 | 44.5 | 41.3 | 33.9 | 22.7 | 10.2 | 2.9 | 0.0 | 0.0 | 0.0 | 0.0 | 0.0 |
| JUNE | 36.1 | 35.9 | 33.3 | 27.3 | 18.3 | 8.3 | 2.3 | 0.0 | 0.0 | 0.0 | 0.0 | 0.0 |
| JULY | 40.5 | 40.2 | 37.3 | 30.7 | 20.6 | 9.3 | 2.6 | 0.0 | 0.0 | 0.0 | 0.0 | 0.0 |
| AUGUST | 44.3 | 44.0 | 40.8 | 33.5 | 22.5 | 10.1 | 2.8 | 0.0 | 0.0 | 0.0 | 0.0 | 0.0 |
| SEPTEMBER | 38.1 | 37.8 | 35.1 | 28.9 | 19.3 | 8.7 | 2.5 | 0.0 | 0.0 | 0.0 | 0.0 | 0.0 |
| OCTOBER | 37.4 | 37.1 | 34.4 | 28.3 | 19.0 | 8.5 | 2.4 | 0.0 | 0.0 | 0.0 | 0.0 | 0.0 |
| NOVEMBER | 32.6 | 32.3 | 30.0 | 24.6 | 16.5 | 7.4 | 2.1 | 0.0 | 0.0 | 0.0 | 0.0 | 0.0 |
| DECEMBER | 31.9 | 31.7 | 29.4 | 24.2 | 16.2 | 7.3 | 2.1 | 0.0 | 0.0 | 0.0 | 0.0 | 0.0 |

FIG.24

QUANTITY OF POWER DRAW (FIRST USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 8.3 | 4.2 | 4.2 | 4.2 | 4.2 | 4.2 | 8.3 | 20.8 | 41.5 | 20.8 | 16.6 | 12.5 |
| FEBRUARY | 7.2 | 3.6 | 3.6 | 3.6 | 3.6 | 3.6 | 7.2 | 18.1 | 36.2 | 18.1 | 14.5 | 10.9 |
| MARCH | 6.6 | 3.3 | 3.3 | 3.3 | 3.3 | 3.3 | 6.6 | 16.5 | 32.9 | 16.5 | 13.2 | 9.9 |
| APRIL | 6.7 | 3.3 | 3.3 | 3.3 | 3.3 | 3.3 | 6.7 | 16.7 | 33.4 | 16.7 | 13.4 | 10.0 |
| MAY | 5.6 | 2.8 | 2.8 | 2.8 | 2.8 | 2.8 | 5.6 | 14.1 | 28.2 | 14.1 | 11.3 | 8.5 |
| JUNE | 4.8 | 2.4 | 2.4 | 2.4 | 2.4 | 2.4 | 4.8 | 11.9 | 23.8 | 11.9 | 9.5 | 7.1 |
| JULY | 5.9 | 3.0 | 3.0 | 3.0 | 3.0 | 3.0 | 5.9 | 14.8 | 29.5 | 14.8 | 11.8 | 8.9 |
| AUGUST | 8.3 | 4.1 | 4.1 | 4.1 | 4.1 | 4.1 | 8.3 | 20.7 | 41.3 | 20.7 | 16.5 | 12.4 |
| SEPTEMBER | 7.8 | 3.9 | 3.9 | 3.9 | 3.9 | 3.9 | 7.8 | 19.6 | 39.1 | 19.6 | 15.6 | 11.7 |
| OCTOBER | 6.5 | 3.2 | 3.2 | 3.2 | 3.2 | 3.2 | 6.5 | 16.2 | 32.3 | 16.2 | 12.9 | 9.7 |
| NOVEMBER | 5.3 | 2.7 | 2.7 | 2.7 | 2.7 | 2.7 | 5.3 | 13.4 | 26.7 | 13.4 | 10.7 | 8.0 |
| DECEMBER | 6.2 | 3.1 | 3.1 | 3.1 | 3.1 | 3.1 | 6.2 | 15.6 | 31.1 | 15.6 | 12.4 | 9.3 |

FIG.25

QUANTITY OF DRAW POWER (FIRST USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 20.8 | 12.5 | 12.5 | 12.5 | 12.5 | 20.8 | 41.5 | 41.5 | 41.5 | 24.9 | 12.5 | 12.5 |
| FEBRUARY | 18.1 | 10.9 | 10.9 | 10.9 | 10.9 | 18.1 | 36.2 | 36.2 | 36.2 | 21.7 | 10.9 | 10.9 |
| MARCH | 16.5 | 9.9 | 9.9 | 9.9 | 9.9 | 16.5 | 32.9 | 32.9 | 32.9 | 19.7 | 9.9 | 9.9 |
| APRIL | 16.7 | 10.0 | 10.0 | 10.0 | 10.0 | 16.7 | 33.4 | 33.4 | 33.4 | 20.0 | 10.0 | 10.0 |
| MAY | 14.1 | 8.5 | 8.5 | 8.5 | 8.5 | 14.1 | 28.2 | 28.2 | 28.2 | 16.9 | 8.5 | 8.5 |
| JUNE | 11.9 | 7.1 | 7.1 | 7.1 | 7.1 | 11.9 | 23.8 | 23.8 | 23.8 | 14.3 | 7.1 | 7.1 |
| JULY | 14.8 | 8.9 | 8.9 | 8.9 | 8.9 | 14.8 | 29.5 | 29.5 | 29.5 | 17.7 | 8.9 | 8.9 |
| AUGUST | 20.7 | 12.4 | 12.4 | 12.4 | 12.4 | 20.7 | 41.3 | 41.3 | 41.3 | 24.8 | 12.4 | 12.4 |
| SEPTEMBER | 19.6 | 11.7 | 11.7 | 11.7 | 11.7 | 19.6 | 39.1 | 39.1 | 39.1 | 23.5 | 11.7 | 11.7 |
| OCTOBER | 16.2 | 9.7 | 9.7 | 9.7 | 9.7 | 16.2 | 32.3 | 32.3 | 32.3 | 19.4 | 9.7 | 9.7 |
| NOVEMBER | 13.4 | 8.0 | 8.0 | 8.0 | 8.0 | 13.4 | 26.7 | 26.7 | 26.7 | 16.0 | 8.0 | 8.0 |
| DECEMBER | 15.6 | 9.3 | 9.3 | 9.3 | 9.3 | 15.6 | 31.1 | 31.1 | 31.1 | 18.7 | 9.3 | 9.3 |

FIG.26 QUANTITY OF BUY POWER (FIRST USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 8.3 | 4.2 | 4.2 | 4.2 | 4.2 | 4.2 | 8.1 | 18.2 | 31.7 | 2.5 | 0.0 | 0.0 |
| FEBRUARY | 7.2 | 3.6 | 3.6 | 3.6 | 3.6 | 3.6 | 7.0 | 15.5 | 26.3 | 0.0 | 0.0 | 0.0 |
| MARCH | 6.6 | 3.3 | 3.3 | 3.3 | 3.3 | 3.3 | 6.3 | 13.3 | 20.8 | 0.0 | 0.0 | 0.0 |
| APRIL | 6.7 | 3.3 | 3.3 | 3.3 | 3.3 | 3.3 | 6.4 | 13.4 | 20.9 | 0.0 | 0.0 | 0.0 |
| MAY | 5.6 | 2.8 | 2.8 | 2.8 | 2.8 | 2.8 | 5.3 | 10.6 | 14.7 | 0.0 | 0.0 | 0.0 |
| JUNE | 4.8 | 2.4 | 2.4 | 2.4 | 2.4 | 2.4 | 4.5 | 9.1 | 13.0 | 0.0 | 0.0 | 0.0 |
| JULY | 5.9 | 3.0 | 3.0 | 3.0 | 3.0 | 3.0 | 5.6 | 11.6 | 17.3 | 0.0 | 0.0 | 0.0 |
| AUGUST | 8.3 | 4.1 | 4.1 | 4.1 | 4.1 | 4.1 | 7.9 | 17.2 | 28.0 | 0.0 | 0.0 | 0.0 |
| SEPTEMBER | 7.8 | 3.9 | 3.9 | 3.9 | 3.9 | 3.9 | 7.5 | 16.6 | 27.7 | 0.0 | 0.0 | 0.0 |
| OCTOBER | 6.5 | 3.2 | 3.2 | 3.2 | 3.2 | 3.2 | 6.2 | 13.2 | 21.1 | 0.0 | 0.0 | 0.0 |
| NOVEMBER | 5.3 | 2.7 | 2.7 | 2.7 | 2.7 | 2.7 | 5.1 | 10.8 | 16.9 | 0.0 | 0.0 | 0.0 |
| DECEMBER | 6.2 | 3.1 | 3.1 | 3.1 | 3.1 | 3.1 | 6.0 | 13.0 | 21.5 | 0.0 | 0.0 | 0.0 |

FIG.27

QUANTITY OF BUY POWER (FIRST USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 0.0 | 0.0 | 0.0 | 0.0 | 0.0 | 13.3 | 39.4 | 41.5 | 41.5 | 24.9 | 12.5 | 12.5 |
| FEBRUARY | 0.0 | 0.0 | 0.0 | 0.0 | 0.0 | 10.5 | 34.1 | 36.2 | 36.2 | 21.7 | 10.9 | 10.9 |
| MARCH | 0.0 | 0.0 | 0.0 | 0.0 | 0.0 | 7.2 | 30.3 | 32.9 | 32.9 | 19.7 | 9.9 | 9.9 |
| APRIL | 0.0 | 0.0 | 0.0 | 0.0 | 0.0 | 7.2 | 30.7 | 33.4 | 33.4 | 20.0 | 10.0 | 10.0 |
| MAY | 0.0 | 0.0 | 0.0 | 0.0 | 0.0 | 3.9 | 25.3 | 28.2 | 28.2 | 16.9 | 8.5 | 8.5 |
| JUNE | 0.0 | 0.0 | 0.0 | 0.0 | 0.0 | 3.6 | 21.5 | 23.8 | 23.8 | 14.3 | 7.1 | 7.1 |
| JULY | 0.0 | 0.0 | 0.0 | 0.0 | 0.0 | 5.5 | 26.9 | 29.5 | 29.5 | 17.7 | 8.9 | 8.9 |
| AUGUST | 0.0 | 0.0 | 0.0 | 0.0 | 0.0 | 10.5 | 38.5 | 41.3 | 41.3 | 24.8 | 12.4 | 12.4 |
| SEPTEMBER | 0.0 | 0.0 | 0.0 | 0.0 | 0.0 | 10.8 | 36.6 | 39.1 | 39.1 | 23.5 | 11.7 | 11.7 |
| OCTOBER | 0.0 | 0.0 | 0.0 | 0.0 | 0.0 | 7.6 | 29.9 | 32.3 | 32.3 | 19.4 | 9.7 | 9.7 |
| NOVEMBER | 0.0 | 0.0 | 0.0 | 0.0 | 0.0 | 5.9 | 24.6 | 26.7 | 26.7 | 16.0 | 8.0 | 8.0 |
| DECEMBER | 0.0 | 0.0 | 0.0 | 0.0 | 0.0 | 8.3 | 29.0 | 31.1 | 31.1 | 18.7 | 9.3 | 9.3 |

FIG.28

QUANTITY OF SELL POWER (FIRST USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 0.0 | 0.0 | 0.0 | 0.0 | 0.0 | 0.0 | 0.0 | 0.0 | 0.0 | 0.0 | 8.9 | 18.4 |
| FEBRUARY | 0.0 | 0.0 | 0.0 | 0.0 | 0.0 | 0.0 | 0.0 | 0.0 | 0.0 | 0.3 | 11.3 | 20.3 |
| MARCH | 0.0 | 0.0 | 0.0 | 0.0 | 0.0 | 0.0 | 0.0 | 0.0 | 0.0 | 6.0 | 18.2 | 28.1 |
| APRIL | 0.0 | 0.0 | 0.0 | 0.0 | 0.0 | 0.0 | 0.0 | 0.0 | 0.0 | 6.5 | 19.1 | 29.3 |
| MAY | 0.0 | 0.0 | 0.0 | 0.0 | 0.0 | 0.0 | 0.0 | 0.0 | 0.0 | 10.9 | 23.6 | 33.8 |
| JUNE | 0.0 | 0.0 | 0.0 | 0.0 | 0.0 | 0.0 | 0.0 | 0.0 | 0.0 | 8.2 | 18.6 | 26.9 |
| JULY | 0.0 | 0.0 | 0.0 | 0.0 | 0.0 | 0.0 | 0.0 | 0.0 | 0.0 | 7.8 | 19.8 | 29.4 |
| AUGUST | 0.0 | 0.0 | 0.0 | 0.0 | 0.0 | 0.0 | 0.0 | 0.0 | 0.0 | 4.0 | 18.0 | 29.4 |
| SEPTEMBER | 0.0 | 0.0 | 0.0 | 0.0 | 0.0 | 0.0 | 0.0 | 0.0 | 0.0 | 1.7 | 14.0 | 24.2 |
| OCTOBER | 0.0 | 0.0 | 0.0 | 0.0 | 0.0 | 0.0 | 0.0 | 0.0 | 0.0 | 4.7 | 16.2 | 25.6 |
| NOVEMBER | 0.0 | 0.0 | 0.0 | 0.0 | 0.0 | 0.0 | 0.0 | 0.0 | 0.0 | 4.8 | 14.7 | 22.7 |
| DECEMBER | 0.0 | 0.0 | 0.0 | 0.0 | 0.0 | 0.0 | 0.0 | 0.0 | 0.0 | 2.2 | 12.4 | 20.8 |

FIG.29

QUANTITY OF SELL POWER (FIRST USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 12.0 | 20.1 | 17.7 | 12.4 | 4.2 | 0.0 | 0.0 | 0.0 | 0.0 | 0.0 | 0.0 | 0.0 |
| FEBRUARY | 15.0 | 22.0 | 19.6 | 14.2 | 5.9 | 0.0 | 0.0 | 0.0 | 0.0 | 0.0 | 0.0 | 0.0 |
| MARCH | 23.9 | 30.2 | 27.3 | 20.7 | 10.6 | 0.0 | 0.0 | 0.0 | 0.0 | 0.0 | 0.0 | 0.0 |
| APRIL | 25.0 | 31.4 | 28.4 | 21.5 | 11.1 | 0.0 | 0.0 | 0.0 | 0.0 | 0.0 | 0.0 | 0.0 |
| MAY | 30.7 | 36.1 | 32.9 | 25.5 | 14.3 | 0.0 | 0.0 | 0.0 | 0.0 | 0.0 | 0.0 | 0.0 |
| JUNE | 24.2 | 28.7 | 26.1 | 20.2 | 11.2 | 0.0 | 0.0 | 0.0 | 0.0 | 0.0 | 0.0 | 0.0 |
| JULY | 25.8 | 31.4 | 28.5 | 21.8 | 11.7 | 0.0 | 0.0 | 0.0 | 0.0 | 0.0 | 0.0 | 0.0 |
| AUGUST | 23.7 | 31.6 | 28.4 | 21.2 | 10.1 | 0.0 | 0.0 | 0.0 | 0.0 | 0.0 | 0.0 | 0.0 |
| SEPTEMBER | 18.6 | 26.1 | 23.4 | 17.1 | 7.6 | 0.0 | 0.0 | 0.0 | 0.0 | 0.0 | 0.0 | 0.0 |
| OCTOBER | 21.2 | 27.4 | 24.8 | 18.6 | 9.3 | 0.0 | 0.0 | 0.0 | 0.0 | 0.0 | 0.0 | 0.0 |
| NOVEMBER | 19.2 | 24.3 | 22.0 | 16.6 | 8.5 | 0.0 | 0.0 | 0.0 | 0.0 | 0.0 | 0.0 | 0.0 |
| DECEMBER | 16.4 | 22.4 | 20.1 | 14.8 | 6.9 | 0.0 | 0.0 | 0.0 | 0.0 | 0.0 | 0.0 | 0.0 |

FIG.30

CONTRACT A FOR FIRST USER

| | BUY | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | TOTAL |
| ~15kWh BASIC RATE ¥301 | 301 | 301 | 301 | 301 | 301 | 301 | 301 | 301 | 301 | 301 | 301 | 301 | |
| 15~120 @¥18.48 | 1940 | 1940 | 1940 | 1940 | 1940 | 1940 | 1940 | 1940 | 1940 | 1940 | 1940 | 1940 | |
| 120~280 @¥24.48 | 3792 | 2805 | 2111 | 2175 | 1219 | 599 | 1516 | 3505 | 3225 | 2055 | 1162 | 1938 | |
| 280~ @¥26.79 | 0 | 0 | 0 | 0 | 0 | 0 | 0 | 0 | 0 | 0 | 0 | 0 | |
| TOTAL | 6034 | 5046 | 4352 | 4417 | 3460 | 2840 | 3758 | 5746 | 5467 | 4297 | 3404 | 4179 | 53000 |

FIG.31

CONTRACT A FOR FIRST USER

| | SELL | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| ~15kWh BASIC RATE ¥301 | 0 | 0 | 0 | 0 | 0 | 0 | 0 | 0 | 0 | 0 | 0 | 0 | |
| 15~120 @¥18.48 | 0 | 0 | 0 | 0 | 0 | 0 | 0 | 0 | 0 | 0 | 0 | 0 | |
| 120~280 @¥24.48 | 2293 | 2658 | 4038 | 4218 | 5085 | 4020 | 4312 | 4072 | 3249 | 3616 | 3250 | 2838 | |
| 280~ @¥26.79 | 0 | 0 | 0 | 0 | 0 | 0 | 0 | 0 | 0 | 0 | 0 | 0 | TOTAL |
| TOTAL | 2293 | 2658 | 4038 | 4218 | 5085 | 4020 | 4312 | 4072 | 3249 | 3616 | 3250 | 2838 | 43649 |

ANNUAL PAYMENT 9351

FIG.32

CONTRACT B FOR FIRST USER (CONTRACTED CAPACITY 6 kVA)

| BUY | JANUARY | FEBRUARY | MARCH | APRIL | MAY | JUNE | JULY | AUGUST | SEPTEMBER | OCTOBER | NOVEMBER | DECEMBER | TOTAL |
|---|---|---|---|---|---|---|---|---|---|---|---|---|---|
| BASIC RATE ¥2160 | 2160 | 2160 | 2160 | 2160 | 2160 | 2160 | 2160 | 2160 | 2160 | 2160 | 2160 | 2160 | |
| ~120kWh @¥15.98 | 1918 | 1918 | 1918 | 1918 | 1918 | 1918 | 1918 | 1918 | 1918 | 1918 | 1918 | 1918 | |
| 120~280 @¥19.60 | 3036 | 2246 | 1690 | 1742 | 976 | 479.6 | 1214 | 2806 | 2582 | 1646 | 930.7 | 1551 | |
| 280~ @¥21.61 | 0 | 0 | 0 | 0 | 0 | 0 | 0 | 0 | 0 | 0 | 0 | 0 | |
| TOTAL | 7114 | 6323 | 5768 | 5819 | 5054 | 4557 | 5292 | 6884 | 6660 | 5723 | 5008 | 5629 | 69831 |

FIG.33

CONTRACT B FOR FIRST USER

|  | SELL | | | | | | | | | | | | |
| --- | --- | --- | --- | --- | --- | --- | --- | --- | --- | --- | --- | --- |
|  | JANUARY | FEBRUARY | MARCH | APRIL | MAY | JUNE | JULY | AUGUST | SEPTEMBER | OCTOBER | NOVEMBER | DECEMBER |
| BASIC RATE ¥2160 | 0 | 0 | 0 | 0 | 0 | 0 | 0 | 0 | 0 | 0 | 0 | 0 |
| ~120kWh @¥15.98 | 0 | 0 | 0 | 0 | 0 | 0 | 0 | 0 | 0 | 0 | 0 | 0 |
| 120~280 @¥19.60 | 1836 | 2128 | 3233 | 3377 | 4071 | 3219 | 3453 | 3260 | 2601 | 2895 | 2602 | 2272 |
| 280~ @¥21.61 | 0 | 0 | 0 | 0 | 0 | 0 | 0 | 0 | 0 | 0 | 0 | 0 |
| TOTAL | 1836 | 2128 | 3233 | 3377 | 4071 | 3219 | 3453 | 3260 | 2601 | 2895 | 2602 | 2272 |

TOTAL 34948

ANNUAL PAYMENT 34883

FIG.34

TIME ZONE BASIS CONTRACT FOR FIRST USER

| | BUY | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | TOTAL |
| BASIC RATE ¥1100 | 1100 | 1100 | 1100 | 1100 | 1100 | 1100 | 1100 | 1100 | 1100 | 1100 | 1100 | 1100 | |
| DAYTIME ~90kWh @¥20.65 | 1859 | 1859 | 1859 | 1859 | 1859 | 1859 | 1859 | 1859 | 1859 | 1859 | 1859 | 1859 | |
| 90~210 @¥27.28 | 3274 | 2765 | 2102 | 2157 | 1262 | 713.9 | 1551 | 3274 | 3140 | 2059 | 1246 | 1966 | |
| 210~ @¥29.90 | 459 | 0 | 0 | 0 | 0 | 0 | 0 | 117.2 | 0 | 0 | 0 | 0 | |
| NIGHTTIME 23:00~7:00 @¥6.78 | 336 | 292.9 | 265.7 | 269.7 | 227.3 | 191.9 | 238 | 333.9 | 316.3 | 261 | 215.7 | 251.5 | |
| TOTAL | 7027 | 6017 | 5326 | 5385 | 4448 | 3864 | 4747 | 6683 | 6415 | 5278 | 4420 | 5176 | 64787 |

FIG.35

TIME ZONE BASIS CONTRACT FOR FIRST USER

| | SELL | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| BASIC RATE ¥1100 | | | | | | | | | | | | | |
| DAYTIME ~90kWh @¥20.65 | 2556 | 2962 | 4500 | 4701 | 5667 | 4480 | 4806 | 4538 | 3621 | 4029 | 3621 | 3162 | |
| 90~210 @¥27.28 | | | | | | | | | | | | | |
| 210~ @¥29.90 | | | | | | | | | | | | | |
| NIGHTTIME 23:00~7:00 @¥6.78 | | | | | | | | | | | | | TOTAL |
| TOTAL | 2556 | 2962 | 4500 | 4701 | 5667 | 4480 | 4806 | 4538 | 3621 | 4029 | 3621 | 3162 | 48642 |
| | | | | | | | | | | ANNUAL PAYMENT | | | 16145 |

FIG.36

QUANTITY OF POWER DRAW (SECOND USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 32.0 | 32.0 | 32.0 | 32.0 | 4.6 | 4.6 | 4.6 | 13.7 | 32.0 | 18.3 | 13.7 | 9.1 |
| FEBRUARY | 27.9 | 27.9 | 27.9 | 27.9 | 4.0 | 4.0 | 4.0 | 11.9 | 27.9 | 15.9 | 11.9 | 8.0 |
| MARCH | 25.3 | 25.3 | 25.3 | 25.3 | 3.6 | 3.6 | 3.6 | 10.9 | 25.3 | 14.5 | 10.9 | 7.2 |
| APRIL | 25.7 | 25.7 | 25.7 | 25.7 | 3.7 | 3.7 | 3.7 | 11.0 | 25.7 | 14.7 | 11.0 | 7.3 |
| MAY | 21.7 | 21.7 | 21.7 | 21.7 | 3.1 | 3.1 | 3.1 | 9.3 | 21.7 | 12.4 | 9.3 | 6.2 |
| JUNE | 18.3 | 18.3 | 18.3 | 18.3 | 2.6 | 2.6 | 2.6 | 7.9 | 18.3 | 10.5 | 7.9 | 5.2 |
| JULY | 22.7 | 22.7 | 22.7 | 22.7 | 3.2 | 3.2 | 3.2 | 9.7 | 22.7 | 13.0 | 9.7 | 6.5 |
| AUGUST | 31.8 | 31.8 | 31.8 | 31.8 | 4.5 | 4.5 | 4.5 | 13.6 | 31.8 | 18.2 | 13.6 | 9.1 |
| SEPTEMBER | 30.1 | 30.1 | 30.1 | 30.1 | 4.3 | 4.3 | 4.3 | 12.9 | 30.1 | 17.2 | 12.9 | 8.6 |
| OCTOBER | 24.9 | 24.9 | 24.9 | 24.9 | 3.6 | 3.6 | 3.6 | 10.7 | 24.9 | 14.2 | 10.7 | 7.1 |
| NOVEMBER | 20.6 | 20.6 | 20.6 | 20.6 | 2.9 | 2.9 | 2.9 | 8.8 | 20.6 | 11.7 | 8.8 | 5.9 |
| DECEMBER | 23.9 | 23.9 | 23.9 | 23.9 | 3.4 | 3.4 | 3.4 | 10.3 | 23.9 | 13.7 | 10.3 | 6.8 |

FIG.37

QUANTITY OF POWER DRAW (SECOND USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 18.3 | 13.7 | 9.1 | 9.1 | 13.7 | 18.3 | 32.0 | 27.4 | 22.8 | 18.3 | 13.7 | 32.0 |
| FEBRUARY | 15.9 | 11.9 | 8.0 | 8.0 | 11.9 | 15.9 | 27.9 | 23.9 | 19.9 | 15.9 | 11.9 | 27.9 |
| MARCH | 14.5 | 10.9 | 7.2 | 7.2 | 10.9 | 14.5 | 25.3 | 21.7 | 18.1 | 14.5 | 10.9 | 25.3 |
| APRIL | 14.7 | 11.0 | 7.3 | 7.3 | 11.0 | 14.7 | 25.7 | 22.0 | 18.4 | 14.7 | 11.0 | 25.7 |
| MAY | 12.4 | 9.3 | 6.2 | 6.2 | 9.3 | 12.4 | 21.7 | 18.6 | 15.5 | 12.4 | 9.3 | 21.7 |
| JUNE | 10.5 | 7.9 | 5.2 | 5.2 | 7.9 | 10.5 | 18.3 | 15.7 | 13.1 | 10.5 | 7.9 | 18.3 |
| JULY | 13.0 | 9.7 | 6.5 | 6.5 | 9.7 | 13.0 | 22.7 | 19.5 | 16.2 | 13.0 | 9.7 | 22.7 |
| AUGUST | 18.2 | 13.6 | 9.1 | 9.1 | 13.6 | 18.2 | 31.8 | 27.3 | 22.7 | 18.2 | 13.6 | 31.8 |
| SEPTEMBER | 17.2 | 12.9 | 8.6 | 8.6 | 12.9 | 17.2 | 30.1 | 25.8 | 21.5 | 17.2 | 12.9 | 30.1 |
| OCTOBER | 14.2 | 10.7 | 7.1 | 7.1 | 10.7 | 14.2 | 24.9 | 21.3 | 17.8 | 14.2 | 10.7 | 24.9 |
| NOVEMBER | 11.7 | 8.8 | 5.9 | 5.9 | 8.8 | 11.7 | 20.6 | 17.6 | 14.7 | 11.7 | 8.8 | 20.6 |
| DECEMBER | 13.7 | 10.3 | 6.8 | 6.8 | 10.3 | 13.7 | 23.9 | 20.5 | 17.1 | 13.7 | 10.3 | 23.9 |

FIG.38

QUANTITY OF BUY POWER (SECOND USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 32.0 | 32.0 | 32.0 | 32.0 | 4.6 | 4.6 | 4.3 | 11.1 | 22.1 | 0.0 | 0.0 | 0.0 |
| FEBRUARY | 27.9 | 27.9 | 27.9 | 27.9 | 4.0 | 4.0 | 3.7 | 9.3 | 18.0 | 0.0 | 0.0 | 0.0 |
| MARCH | 25.3 | 25.3 | 25.3 | 25.3 | 3.6 | 3.6 | 3.3 | 7.7 | 13.2 | 0.0 | 0.0 | 0.0 |
| APRIL | 25.7 | 25.7 | 25.7 | 25.7 | 3.7 | 3.7 | 3.4 | 7.7 | 13.2 | 0.0 | 0.0 | 0.0 |
| MAY | 21.7 | 21.7 | 21.7 | 21.7 | 3.1 | 3.1 | 2.8 | 5.8 | 8.3 | 0.0 | 0.0 | 0.0 |
| JUNE | 18.3 | 18.3 | 18.3 | 18.3 | 2.6 | 2.6 | 2.4 | 5.0 | 7.5 | 0.0 | 0.0 | 0.0 |
| JULY | 22.7 | 22.7 | 22.7 | 22.7 | 3.2 | 3.2 | 3.0 | 6.6 | 10.6 | 0.0 | 0.0 | 0.0 |
| AUGUST | 31.8 | 31.8 | 31.8 | 31.8 | 4.5 | 4.5 | 4.2 | 10.1 | 18.5 | 0.0 | 0.0 | 0.0 |
| SEPTEMBER | 30.1 | 30.1 | 30.1 | 30.1 | 4.3 | 4.3 | 4.0 | 9.9 | 18.7 | 0.0 | 0.0 | 0.0 |
| OCTOBER | 24.9 | 24.9 | 24.9 | 24.9 | 3.6 | 3.6 | 3.3 | 7.7 | 13.7 | 0.0 | 0.0 | 0.0 |
| NOVEMBER | 20.6 | 20.6 | 20.6 | 20.6 | 2.9 | 2.9 | 2.7 | 6.3 | 10.8 | 0.0 | 0.0 | 0.0 |
| DECEMBER | 23.9 | 23.9 | 23.9 | 23.9 | 3.4 | 3.4 | 3.2 | 7.8 | 14.4 | 0.0 | 0.0 | 0.0 |

FIG.39

QUANTITY OF BUY POWER (SECOND USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 0.0 | 0.0 | 0.0 | 0.0 | 0.0 | 10.8 | 29.8 | 27.4 | 22.8 | 18.3 | 13.7 | 32.0 |
| FEBRUARY | 0.0 | 0.0 | 0.0 | 0.0 | 0.0 | 8.4 | 25.7 | 23.9 | 19.9 | 15.9 | 11.9 | 27.9 |
| MARCH | 0.0 | 0.0 | 0.0 | 0.0 | 0.0 | 5.3 | 22.7 | 21.7 | 18.1 | 14.5 | 10.9 | 25.3 |
| APRIL | 0.0 | 0.0 | 0.0 | 0.0 | 0.0 | 5.2 | 23.0 | 22.0 | 18.4 | 14.7 | 11.0 | 25.7 |
| MAY | 0.0 | 0.0 | 0.0 | 0.0 | 0.0 | 2.2 | 18.8 | 18.6 | 15.5 | 12.4 | 9.3 | 21.7 |
| JUNE | 0.0 | 0.0 | 0.0 | 0.0 | 0.0 | 2.2 | 16.0 | 15.7 | 13.1 | 10.5 | 7.9 | 18.3 |
| JULY | 0.0 | 0.0 | 0.0 | 0.0 | 0.0 | 3.7 | 20.1 | 19.5 | 16.2 | 13.0 | 9.7 | 22.7 |
| AUGUST | 0.0 | 0.0 | 0.0 | 0.0 | 0.0 | 8.0 | 29.0 | 27.3 | 22.7 | 18.2 | 13.6 | 31.8 |
| SEPTEMBER | 0.0 | 0.0 | 0.0 | 0.0 | 0.0 | 8.5 | 27.7 | 25.8 | 21.5 | 17.2 | 12.9 | 30.1 |
| OCTOBER | 0.0 | 0.0 | 0.0 | 0.0 | 0.0 | 5.7 | 22.5 | 21.3 | 17.8 | 14.2 | 10.7 | 24.9 |
| NOVEMBER | 0.0 | 0.0 | 0.0 | 0.0 | 0.0 | 4.3 | 18.5 | 17.6 | 14.7 | 11.7 | 8.8 | 20.6 |
| DECEMBER | 0.0 | 0.0 | 0.0 | 0.0 | 0.0 | 6.4 | 21.9 | 20.5 | 17.1 | 13.7 | 10.3 | 23.9 |

FIG.40

QUANTITY OF SELL POWER (SECOND USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 0.0 | 0.0 | 0.0 | 0.0 | 0.0 | 0.0 | 0.0 | 0.0 | 0.0 | 0.0 | 11.8 | 21.8 |
| FEBRUARY | 0.0 | 0.0 | 0.0 | 0.0 | 0.0 | 0.0 | 0.0 | 0.0 | 0.0 | 2.5 | 13.8 | 23.2 |
| MARCH | 0.0 | 0.0 | 0.0 | 0.0 | 0.0 | 0.0 | 0.0 | 0.0 | 0.0 | 8.0 | 20.5 | 30.8 |
| APRIL | 0.0 | 0.0 | 0.0 | 0.0 | 0.0 | 0.0 | 0.0 | 0.0 | 0.0 | 8.5 | 21.4 | 32.0 |
| MAY | 0.0 | 0.0 | 0.0 | 0.0 | 0.0 | 0.0 | 0.0 | 0.0 | 0.0 | 12.6 | 25.6 | 36.1 |
| JUNE | 0.0 | 0.0 | 0.0 | 0.0 | 0.0 | 0.0 | 0.0 | 0.0 | 0.0 | 9.7 | 20.3 | 28.8 |
| JULY | 0.0 | 0.0 | 0.0 | 0.0 | 0.0 | 0.0 | 0.0 | 0.0 | 0.0 | 9.6 | 21.8 | 31.7 |
| AUGUST | 0.0 | 0.0 | 0.0 | 0.0 | 0.0 | 0.0 | 0.0 | 0.0 | 0.0 | 6.5 | 20.9 | 32.7 |
| SEPTEMBER | 0.0 | 0.0 | 0.0 | 0.0 | 0.0 | 0.0 | 0.0 | 0.0 | 0.0 | 4.0 | 16.8 | 27.3 |
| OCTOBER | 0.0 | 0.0 | 0.0 | 0.0 | 0.0 | 0.0 | 0.0 | 0.0 | 0.0 | 6.6 | 18.4 | 28.1 |
| NOVEMBER | 0.0 | 0.0 | 0.0 | 0.0 | 0.0 | 0.0 | 0.0 | 0.0 | 0.0 | 6.4 | 16.5 | 24.8 |
| DECEMBER | 0.0 | 0.0 | 0.0 | 0.0 | 0.0 | 0.0 | 0.0 | 0.0 | 0.0 | 4.1 | 14.6 | 23.3 |

FIG.41

QUANTITY OF SELL POWER (SECOND USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 14.5 | 18.8 | 21.1 | 15.7 | 2.9 | 0.0 | 0.0 | 0.0 | 0.0 | 0.0 | 0.0 | 0.0 |
| FEBRUARY | 17.1 | 20.9 | 22.5 | 17.1 | 4.8 | 0.0 | 0.0 | 0.0 | 0.0 | 0.0 | 0.0 | 0.0 |
| MARCH | 25.8 | 29.2 | 29.9 | 23.3 | 9.6 | 0.0 | 0.0 | 0.0 | 0.0 | 0.0 | 0.0 | 0.0 |
| APRIL | 27.0 | 30.4 | 31.1 | 24.2 | 10.1 | 0.0 | 0.0 | 0.0 | 0.0 | 0.0 | 0.0 | 0.0 |
| MAY | 32.4 | 35.2 | 35.1 | 27.7 | 13.4 | 0.0 | 0.0 | 0.0 | 0.0 | 0.0 | 0.0 | 0.0 |
| JUNE | 25.6 | 28.0 | 28.0 | 22.1 | 10.5 | 0.0 | 0.0 | 0.0 | 0.0 | 0.0 | 0.0 | 0.0 |
| JULY | 27.6 | 30.5 | 30.9 | 24.2 | 10.8 | 0.0 | 0.0 | 0.0 | 0.0 | 0.0 | 0.0 | 0.0 |
| AUGUST | 26.1 | 30.4 | 31.7 | 24.5 | 8.8 | 0.0 | 0.0 | 0.0 | 0.0 | 0.0 | 0.0 | 0.0 |
| SEPTEMBER | 20.9 | 24.9 | 26.5 | 20.3 | 6.4 | 0.0 | 0.0 | 0.0 | 0.0 | 0.0 | 0.0 | 0.0 |
| OCTOBER | 23.2 | 26.5 | 27.3 | 21.2 | 8.3 | 0.0 | 0.0 | 0.0 | 0.0 | 0.0 | 0.0 | 0.0 |
| NOVEMBER | 20.8 | 23.5 | 24.1 | 18.8 | 7.7 | 0.0 | 0.0 | 0.0 | 0.0 | 0.0 | 0.0 | 0.0 |
| DECEMBER | 18.2 | 21.4 | 22.6 | 17.3 | 5.9 | 0.0 | 0.0 | 0.0 | 0.0 | 0.0 | 0.0 | 0.0 |

FIG.42

CONTRACT A FOR SECOND USER

| | BUY | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| ~15kWh BASIC RATE ¥301 | 301 | 301 | 301 | 301 | 301 | 301 | 301 | 301 | 301 | 301 | 301 | 301 | |
| 15~120 @¥18.48 | 1940 | 1940 | 1940 | 1940 | 1940 | 1940 | 1940 | 1940 | 1940 | 1940 | 1940 | 1940 | |
| 120~280 @¥24.48 | 3917 | 3917 | 3214 | 3295 | 2165 | 1397 | 2506 | 3917 | 3917 | 3139 | 2058 | 2981 | |
| 280~ @¥26.79 | 1320 | 111.7 | 0 | 0 | 0 | 0 | 0 | 1065 | 678.1 | 0 | 0 | 0 | 0 TOTAL |
| TOTAL | 7478 | 6270 | 5456 | 5537 | 4406 | 3639 | 4747 | 7223 | 6836 | 5380 | 4299 | 5222 | 66493 |

FIG.43

CONTRACT A FOR SECOND USER

| | SELL | | | | | | | | | | | | |
|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER |
| ~15kWh BASIC RATE ¥301 | 0 | 0 | 0 | 0 | 0 | 0 | 0 | 0 | 0 | 0 | 0 | 0 |
| 15~120 @¥18.48 | 0 | 0 | 0 | 0 | 0 | 0 | 0 | 0 | 0 | 0 | 0 | 0 |
| 120~280 @¥24.48 | 2608 | 2986 | 4336 | 4521 | 5341 | 4235 | 4580 | 4446 | 3603 | 3908 | 3492 | 3119 |
| 280~ @¥26.79 | 0 | 0 | 0 | 0 | 0 | 0 | 0 | 0 | 0 | 0 | 0 | 0 |
| TOTAL | 2608 | 2986 | 4336 | 4521 | 5341 | 4235 | 4580 | 4446 | 3603 | 3908 | 3492 | 3119 |

TOTAL 47175

ANNUAL PAYMENT 19318

FIG.44

CONTRACT B FOR SECOND USER (CONTRACTED CAPACITY 6 kVA)

| BUY | JANUARY | FEBRUARY | MARCH | APRIL | MAY | JUNE | JULY | AUGUST | SEPTEMBER | OCTOBER | NOVEMBER | DECEMBER | TOTAL |
|---|---|---|---|---|---|---|---|---|---|---|---|---|---|
| BASIC RATE ¥2160 | 2160 | 2160 | 2160 | 2160 | 2160 | 2160 | 2160 | 2160 | 2160 | 2160 | 2160 | 2160 | |
| ~120kWh @¥15.98 | 1918 | 1918 | 1918 | 1918 | 1918 | 1918 | 1918 | 1918 | 1918 | 1918 | 1918 | 1918 | |
| 120~280 @¥19.60 | 3136 | 3136 | 2574 | 2638 | 1733 | 1119 | 2006 | 3136 | 3136 | 2513 | 1648 | 2386 | |
| 280~ @¥21.61 | 1065 | 90.12 | 0 | 0 | 0 | 0 | 0 | 858.9 | 547 | 0 | 0 | 0 | 0 |
| TOTAL | 8279 | 7304 | 6651 | 6716 | 5811 | 5196 | 6084 | 8072 | 7761 | 6591 | 5725 | 6464 | 80653 |

FIG.45

CONTRACT B FOR SECOND USER

| | SELL | | | | | | | | | | | | |
|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER |
| BASIC RATE ¥2160 | 0 | 0 | 0 | 0 | 0 | 0 | 0 | 0 | 0 | 0 | 0 | 0 |
| ~120kWh @¥15.98 | 0 | 0 | 0 | 0 | 0 | 0 | 0 | 0 | 0 | 0 | 0 | 0 |
| 120~280 @¥19.60 | 2088 | 2391 | 3471 | 3619 | 4276 | 3391 | 3667 | 3560 | 2885 | 3129 | 2796 | 2498 |
| 280~ @¥21.61 | 0 | 0 | 0 | 0 | 0 | 0 | 0 | 0 | 0 | 0 | 0 | 0 |
| TOTAL | 2088 | 2391 | 3471 | 3619 | 4276 | 3391 | 3667 | 3560 | 2885 | 3129 | 2796 | 2498 |

TOTAL 37771

ANNUAL PAYMENT 42883

FIG.46

TIME ZONE BASIS CONTRACT FOR SECOND USER

| | BUY | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | TOTAL |
| BASIC RATE ¥1100 | 1100 | 1100 | 1100 | 1100 | 1100 | 1100 | 1100 | 1100 | 1100 | 1100 | 1100 | 1100 | |
| DAYTIME | | | | | | | | | | | | | |
| ~90kWh @¥20.65 | 1859 | 1859 | 1859 | 1859 | 1859 | 1608 | 1859 | 1859 | 1859 | 1859 | 1859 | 1859 | |
| 90~210 @¥27.28 | 1802 | 1176 | 656.6 | 690.1 | 23.86 | 0 | 254.8 | 1567 | 1423 | 640.2 | 73.33 | 599.8 | |
| 210~ @¥29.90 | 0 | 0 | 0 | 0 | 0 | 0 | 0 | 0 | 0 | 0 | 0 | 0 | |
| NIGHTTIME | | | | | | | | | | | | | |
| 23:00~7:00 @¥6.78 | 1175 | 1024 | 930.4 | 944.6 | 797 | 672.8 | 834.1 | 1168 | 1106 | 913.6 | 755.1 | 879.8 | |
| TOTAL | 5935 | 5158 | 4546 | 4593 | 3779 | 3380 | 4047 | 5693 | 5487 | 4512 | 3787 | 4438 | 55357 |

FIG.47

TIME ZONE BASIS CONTRACT FOR SECOND USER

| | SELL | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| BASIC RATE ¥1100 | | | | | | | | | | | | | |
| DAYTIME ~90kWh @¥20.65 | 2907 | 3328 | 4832 | 5038 | 5951 | 4720 | 5103 | 4955 | 4015 | 4355 | 3891 | 3476 | |
| 90~210 @¥27.28 | | | | | | | | | | | | | |
| 210~ @¥29.90 | | | | | | | | | | | | | |
| NIGHTTIME 23:00~7:00 @¥6.78 | | | | | | | | | | | | | TOTAL |
| TOTAL | 2907 | 3328 | 4832 | 5038 | 5951 | 4720 | 5103 | 4955 | 4015 | 4355 | 3891 | 3476 | 52571 |

ANNUAL PAYMENT 2786

FIG.48

QUANTITY OF POWER DRAW (THIRD USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 20.8 | 10.4 | 10.4 | 10.4 | 10.4 | 10.4 | 20.8 | 51.9 | 103.8 | 51.9 | 41.5 | 31.1 |
| FEBRUARY | 18.1 | 9.1 | 9.1 | 9.1 | 9.1 | 9.1 | 18.1 | 45.3 | 90.5 | 45.3 | 36.2 | 27.2 |
| MARCH | 16.5 | 8.2 | 8.2 | 8.2 | 8.2 | 8.2 | 16.5 | 41.1 | 82.3 | 41.1 | 32.9 | 24.7 |
| APRIL | 16.7 | 8.4 | 8.4 | 8.4 | 8.4 | 8.4 | 16.7 | 41.8 | 83.5 | 41.8 | 33.4 | 25.1 |
| MAY | 14.1 | 7.1 | 7.1 | 7.1 | 7.1 | 7.1 | 14.1 | 35.3 | 70.5 | 35.3 | 28.2 | 21.2 |
| JUNE | 11.9 | 6.0 | 6.0 | 6.0 | 6.0 | 6.0 | 11.9 | 29.8 | 59.5 | 29.8 | 23.8 | 17.9 |
| JULY | 14.8 | 7.4 | 7.4 | 7.4 | 7.4 | 7.4 | 14.8 | 36.9 | 73.8 | 36.9 | 29.5 | 22.1 |
| AUGUST | 20.7 | 10.3 | 10.3 | 10.3 | 10.3 | 10.3 | 20.7 | 51.6 | 103.3 | 51.6 | 41.3 | 31.0 |
| SEPTEMBER | 19.6 | 9.8 | 9.8 | 9.8 | 9.8 | 9.8 | 19.6 | 48.9 | 97.8 | 48.9 | 39.1 | 29.3 |
| OCTOBER | 16.2 | 8.1 | 8.1 | 8.1 | 8.1 | 8.1 | 16.2 | 40.4 | 80.8 | 40.4 | 32.3 | 24.2 |
| NOVEMBER | 13.4 | 6.7 | 6.7 | 6.7 | 6.7 | 6.7 | 13.4 | 33.4 | 66.8 | 33.4 | 26.7 | 20.0 |
| DECEMBER | 15.6 | 7.8 | 7.8 | 7.8 | 7.8 | 7.8 | 15.6 | 38.9 | 77.8 | 38.9 | 31.1 | 23.3 |

FIG.49

QUANTITY OF POWER DRAW (THIRD USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 51.9 | 31.1 | 31.1 | 31.1 | 31.1 | 51.9 | 103.8 | 103.8 | 103.8 | 62.3 | 31.1 | 31.1 |
| FEBRUARY | 45.3 | 27.2 | 27.2 | 27.2 | 27.2 | 45.3 | 90.5 | 90.5 | 90.5 | 54.3 | 27.2 | 27.2 |
| MARCH | 41.1 | 24.7 | 24.7 | 24.7 | 24.7 | 41.1 | 82.3 | 82.3 | 82.3 | 49.4 | 24.7 | 24.7 |
| APRIL | 41.8 | 25.1 | 25.1 | 25.1 | 25.1 | 41.8 | 83.5 | 83.5 | 83.5 | 50.1 | 25.1 | 25.1 |
| MAY | 35.3 | 21.2 | 21.2 | 21.2 | 21.2 | 35.3 | 70.5 | 70.5 | 70.5 | 42.3 | 21.2 | 21.2 |
| JUNE | 29.8 | 17.9 | 17.9 | 17.9 | 17.9 | 29.8 | 59.5 | 59.5 | 59.5 | 35.7 | 17.9 | 17.9 |
| JULY | 36.9 | 22.1 | 22.1 | 22.1 | 22.1 | 36.9 | 73.8 | 73.8 | 73.8 | 44.3 | 22.1 | 22.1 |
| AUGUST | 51.6 | 31.0 | 31.0 | 31.0 | 31.0 | 51.6 | 103.3 | 103.3 | 103.3 | 62.0 | 31.0 | 31.0 |
| SEPTEMBER | 48.9 | 29.3 | 29.3 | 29.3 | 29.3 | 48.9 | 97.8 | 97.8 | 97.8 | 58.7 | 29.3 | 29.3 |
| OCTOBER | 40.4 | 24.2 | 24.2 | 24.2 | 24.2 | 40.4 | 80.8 | 80.8 | 80.8 | 48.5 | 24.2 | 24.2 |
| NOVEMBER | 33.4 | 20.0 | 20.0 | 20.0 | 20.0 | 33.4 | 66.8 | 66.8 | 66.8 | 40.1 | 20.0 | 20.0 |
| DECEMBER | 38.9 | 23.3 | 23.3 | 23.3 | 23.3 | 38.9 | 77.8 | 77.8 | 77.8 | 46.7 | 23.3 | 23.3 |

FIG.50

QUANTITY OF BUY POWER (THIRD USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 20.8 | 10.4 | 10.4 | 10.4 | 10.4 | 10.4 | 20.5 | 49.3 | 93.9 | 33.6 | 16.0 | 0.2 |
| FEBRUARY | 18.1 | 9.1 | 9.1 | 9.1 | 9.1 | 9.1 | 17.9 | 42.7 | 80.6 | 26.8 | 10.4 | 0.0 |
| MARCH | 16.5 | 8.2 | 8.2 | 8.2 | 8.2 | 8.2 | 16.2 | 38.0 | 70.2 | 18.7 | 1.5 | 0.0 |
| APRIL | 16.7 | 8.4 | 8.4 | 8.4 | 8.4 | 8.4 | 16.4 | 38.5 | 71.0 | 18.5 | 0.9 | 0.0 |
| MAY | 14.1 | 7.1 | 7.1 | 7.1 | 7.1 | 7.1 | 13.8 | 31.7 | 57.0 | 10.3 | 0.0 | 0.0 |
| JUNE | 11.9 | 6.0 | 6.0 | 6.0 | 6.0 | 6.0 | 11.6 | 26.9 | 48.7 | 9.6 | 0.0 | 0.0 |
| JULY | 14.8 | 7.4 | 7.4 | 7.4 | 7.4 | 7.4 | 14.5 | 33.7 | 61.6 | 14.3 | 0.0 | 0.0 |
| AUGUST | 20.7 | 10.3 | 10.3 | 10.3 | 10.3 | 10.3 | 20.3 | 48.1 | 90.0 | 26.9 | 6.8 | 0.0 |
| SEPTEMBER | 19.6 | 9.8 | 9.8 | 9.8 | 9.8 | 9.8 | 19.3 | 45.9 | 86.3 | 27.6 | 9.4 | 0.0 |
| OCTOBER | 16.2 | 8.1 | 8.1 | 8.1 | 8.1 | 8.1 | 15.9 | 37.4 | 69.5 | 19.5 | 3.2 | 0.0 |
| NOVEMBER | 13.4 | 6.7 | 6.7 | 6.7 | 6.7 | 6.7 | 13.1 | 30.8 | 57.0 | 15.2 | 1.4 | 0.0 |
| DECEMBER | 15.6 | 7.8 | 7.8 | 7.8 | 7.8 | 7.8 | 15.3 | 36.4 | 68.2 | 21.1 | 6.2 | 0.0 |

FIG.51 QUANTITY OF BUY POWER (THIRD USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 19.1 | 0.0 | 0.9 | 6.3 | 14.5 | 44.4 | 101.6 | 103.8 | 103.8 | 62.3 | 31.1 | 31.1 |
| FEBRUARY | 12.2 | 0.0 | 0.0 | 2.1 | 10.4 | 37.7 | 88.4 | 90.5 | 90.5 | 54.3 | 27.2 | 27.2 |
| MARCH | 0.8 | 0.0 | 0.0 | 0.0 | 4.2 | 31.9 | 79.7 | 82.3 | 82.3 | 49.4 | 24.7 | 24.7 |
| APRIL | 0.1 | 0.0 | 0.0 | 0.0 | 3.9 | 32.2 | 80.8 | 83.5 | 83.5 | 50.1 | 25.1 | 25.1 |
| MAY | 0.0 | 0.0 | 0.0 | 0.0 | 0.0 | 25.0 | 67.6 | 70.5 | 70.5 | 42.3 | 21.2 | 21.2 |
| JUNE | 0.0 | 0.0 | 0.0 | 0.0 | 0.0 | 21.5 | 57.2 | 59.5 | 59.5 | 35.7 | 17.9 | 17.9 |
| JULY | 0.0 | 0.0 | 0.0 | 0.0 | 1.6 | 27.6 | 71.1 | 73.8 | 73.8 | 44.3 | 22.1 | 22.1 |
| AUGUST | 7.3 | 0.0 | 0.0 | 0.5 | 8.5 | 41.5 | 100.4 | 103.3 | 103.3 | 62.0 | 31.0 | 31.0 |
| SEPTEMBER | 10.8 | 0.0 | 0.0 | 0.0 | 10.0 | 40.2 | 95.3 | 97.8 | 97.8 | 58.7 | 29.3 | 29.3 |
| OCTOBER | 3.0 | 0.0 | 0.0 | 0.0 | 5.3 | 31.8 | 78.3 | 80.8 | 80.8 | 48.5 | 24.2 | 24.2 |
| NOVEMBER | 0.8 | 0.0 | 0.0 | 0.0 | 3.5 | 25.9 | 64.7 | 66.8 | 66.8 | 40.1 | 20.0 | 20.0 |
| DECEMBER | 7.0 | 0.0 | 0.0 | 0.0 | 7.1 | 31.6 | 75.7 | 77.8 | 77.8 | 46.7 | 23.3 | 23.3 |

FIG.52

QUANTITY OF SELL POWER (THIRD USER: BEFORE NOON)

| | 0:00 | 1:00 | 2:00 | 3:00 | 4:00 | 5:00 | 6:00 | 7:00 | 8:00 | 9:00 | 10:00 | 11:00 |
|---|---|---|---|---|---|---|---|---|---|---|---|---|
| JANUARY | 0.0 | 0.0 | 0.0 | 0.0 | 0.0 | 0.0 | 0.0 | 0.0 | 0.0 | 0.0 | 0.0 | 0.0 |
| FEBRUARY | 0.0 | 0.0 | 0.0 | 0.0 | 0.0 | 0.0 | 0.0 | 0.0 | 0.0 | 0.0 | 0.0 | 4.0 |
| MARCH | 0.0 | 0.0 | 0.0 | 0.0 | 0.0 | 0.0 | 0.0 | 0.0 | 0.0 | 0.0 | 0.0 | 13.3 |
| APRIL | 0.0 | 0.0 | 0.0 | 0.0 | 0.0 | 0.0 | 0.0 | 0.0 | 0.0 | 0.0 | 0.0 | 14.3 |
| MAY | 0.0 | 0.0 | 0.0 | 0.0 | 0.0 | 0.0 | 0.0 | 0.0 | 0.0 | 0.0 | 6.7 | 21.1 |
| JUNE | 0.0 | 0.0 | 0.0 | 0.0 | 0.0 | 0.0 | 0.0 | 0.0 | 0.0 | 0.0 | 4.3 | 16.2 |
| JULY | 0.0 | 0.0 | 0.0 | 0.0 | 0.0 | 0.0 | 0.0 | 0.0 | 0.0 | 0.0 | 2.1 | 16.1 |
| AUGUST | 0.0 | 0.0 | 0.0 | 0.0 | 0.0 | 0.0 | 0.0 | 0.0 | 0.0 | 0.0 | 0.0 | 10.8 |
| SEPTEMBER | 0.0 | 0.0 | 0.0 | 0.0 | 0.0 | 0.0 | 0.0 | 0.0 | 0.0 | 0.0 | 0.0 | 6.6 |
| OCTOBER | 0.0 | 0.0 | 0.0 | 0.0 | 0.0 | 0.0 | 0.0 | 0.0 | 0.0 | 0.0 | 0.0 | 11.0 |
| NOVEMBER | 0.0 | 0.0 | 0.0 | 0.0 | 0.0 | 0.0 | 0.0 | 0.0 | 0.0 | 0.0 | 0.0 | 10.7 |
| DECEMBER | 0.0 | 0.0 | 0.0 | 0.0 | 0.0 | 0.0 | 0.0 | 0.0 | 0.0 | 0.0 | 0.0 | 6.8 |

FIG.53

QUANTITY OF SELL POWER (THIRD USER: AFTERNOON)

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| JANUARY | 0.0 | 1.4 | 0.0 | 0.0 | 0.0 | 0.0 | 0.0 | 0.0 | 0.0 | 0.0 | 0.0 | 0.0 |
| FEBRUARY | 0.0 | 5.7 | 3.3 | 0.0 | 0.0 | 0.0 | 0.0 | 0.0 | 0.0 | 0.0 | 0.0 | 0.0 |
| MARCH | 0.0 | 15.4 | 12.5 | 5.9 | 0.0 | 0.0 | 0.0 | 0.0 | 0.0 | 0.0 | 0.0 | 0.0 |
| APRIL | 0.0 | 16.3 | 13.4 | 6.5 | 0.0 | 0.0 | 0.0 | 0.0 | 0.0 | 0.0 | 0.0 | 0.0 |
| MAY | 9.6 | 23.4 | 20.2 | 12.8 | 1.6 | 0.0 | 0.0 | 0.0 | 0.0 | 0.0 | 0.0 | 0.0 |
| JUNE | 6.4 | 18.0 | 15.4 | 9.5 | 0.5 | 0.0 | 0.0 | 0.0 | 0.0 | 0.0 | 0.0 | 0.0 |
| JULY | 3.7 | 18.1 | 15.2 | 8.6 | 0.0 | 0.0 | 0.0 | 0.0 | 0.0 | 0.0 | 0.0 | 0.0 |
| AUGUST | 0.0 | 13.0 | 9.9 | 2.6 | 0.0 | 0.0 | 0.0 | 0.0 | 0.0 | 0.0 | 0.0 | 0.0 |
| SEPTEMBER | 0.0 | 8.5 | 5.8 | 0.0 | 0.0 | 0.0 | 0.0 | 0.0 | 0.0 | 0.0 | 0.0 | 0.0 |
| OCTOBER | 0.0 | 12.9 | 10.2 | 4.1 | 0.0 | 0.0 | 0.0 | 0.0 | 0.0 | 0.0 | 0.0 | 0.0 |
| NOVEMBER | 0.0 | 12.3 | 10.0 | 4.6 | 0.0 | 0.0 | 0.0 | 0.0 | 0.0 | 0.0 | 0.0 | 0.0 |
| DECEMBER | 0.0 | 8.4 | 6.1 | 0.8 | 0.0 | 0.0 | 0.0 | 0.0 | 0.0 | 0.0 | 0.0 | 0.0 |

FIG.54

CONTRACT A OF THIRD USER

| | BUY | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| ~15kWh BASIC RATE ¥301 | 301 | 301 | 301 | 301 | 301 | 301 | 301 | 301 | 301 | 301 | 301 | 301 | |
| 15~120 @¥18.48 | 1940 | 1940 | 1940 | 1940 | 1940 | 1940 | 1940 | 1940 | 1940 | 1940 | 1940 | 1940 | |
| 120~280 @¥24.48 | 3917 | 3917 | 3917 | 3917 | 3917 | 3917 | 3917 | 3917 | 3917 | 3917 | 3917 | 3917 | |
| 280~ @¥26.79 | 14068 | 10771 | 8086 | 8252 | 5369 | 3417 | 6215 | 12660 | 11960 | 8009 | 5165 | 7817 | TOTAL |
| TOTAL | 20227 | 16929 | 14244 | 14410 | 11527 | 9576 | 12373 | 18818 | 18119 | 14168 | 11323 | 13975 | 175687 |

FIG.55

CONTRACT A FOR THIRD USER

| | SELL | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| ~15kWh BASIC RATE ¥301 | | | | | | | | | | | | | |
| 15~120 @¥18.48 | 0 | 0 | 0 | 0 | 0 | 0 | 0 | 0 | 0 | 0 | 0 | 0 | |
| 120~280 @¥24.48 | 34.3 | 319.5 | 1151 | 1235 | 2334 | 1721 | 1559 | 887.4 | 512.2 | 935.2 | 919.1 | 540.2 | |
| 280~ @¥26.79 | 0 | 0 | 0 | 0 | 0 | 0 | 0 | 0 | 0 | 0 | 0 | 0 | TOTAL |
| TOTAL | 34.3 | 319.5 | 1151 | 1235 | 2334 | 1721 | 1559 | 887.4 | 512.2 | 935.2 | 919.1 | 540.2 | 12148 |

ANNUAL PAYMENT    163539

FIG.56

CONTRACT B FOR THIRD USER (CONTRACTED CAPACITY 6 kVA)

| | BUY | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| BASIC RATE ¥2160 | 2160 | 2160 | 2160 | 2160 | 2160 | 2160 | 2160 | 2160 | 2160 | 2160 | 2160 | 2160 | |
| ~120kWh @¥15.98 | 1918 | 1918 | 1918 | 1918 | 1918 | 1918 | 1918 | 1918 | 1918 | 1918 | 1918 | 1918 | |
| 120~280 @¥19.60 | 3136 | 3136 | 3136 | 3136 | 3136 | 3136 | 3136 | 3136 | 3136 | 3136 | 3136 | 3136 | |
| 280~ @¥21.61 | 11348 | 8688 | 6522 | 6656 | 4331 | 2757 | 5013 | 10212 | 9648 | 6461 | 4166 | 6306 | TOTAL |
| TOTAL | 18562 | 15902 | 13736 | 13870 | 11544 | 9970 | 12227 | 17426 | 16861 | 13674 | 11380 | 13519 | 168670 |

FIG.57

CONTRACT B FOR THIRD USER

| | SELL | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| BASIC RATE ¥2160 | 0 | 0 | 0 | 0 | 0 | 0 | 0 | 0 | 0 | 0 | 0 | 0 | |
| ~120kWh @¥15.98 | 0 | 0 | 0 | 0 | 0 | 0 | 0 | 0 | 0 | 0 | 0 | 0 | |
| 120~280 @¥19.60 | 27.46 | 255.8 | 921.7 | 989 | 1868 | 1378 | 1248 | 710.5 | 410.1 | 748.8 | 735.9 | 432.5 | |
| 280~ @¥21.61 | 0 | 0 | 0 | 0 | 0 | 0 | 0 | 0 | 0 | 0 | 0 | 0 | TOTAL |
| TOTAL | 27.46 | 255.8 | 921.7 | 989 | 1868 | 1378 | 1248 | 710.5 | 410.1 | 748.8 | 735.9 | 432.5 | 9727 |

ANNUAL PAYMENT  158944

FIG.58

TIME ZONE BASIS CONTRACT FOR THIRD USER

| | BUY | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | TOTAL |
| BASIC RATE ¥1100 | 1100 | 1100 | 1100 | 1100 | 1100 | 1100 | 1100 | 1100 | 1100 | 1100 | 1100 | 1100 | |
| DAYTIME | | | | | | | | | | | | | |
| ~90kWh @¥20.65 | 1859 | 1859 | 1859 | 1859 | 1859 | 1859 | 1859 | 1859 | 1859 | 1859 | 1859 | 1859 | |
| 90~210 @¥27.28 | 3274 | 3274 | 3274 | 3274 | 3274 | 3274 | 3274 | 3274 | 3274 | 3274 | 3274 | 3274 | |
| 210~ @¥29.90 | 14079 | 10874 | 8175 | 8315 | 5565 | 3780 | 6392 | 12528 | 11943 | 8143 | 5469 | 8035 | |
| NIGHTTIME | | | | | | | | | | | | | |
| 23:00~7:00 @¥6.78 | 842.5 | 734.7 | 667.2 | 677.3 | 571.4 | 482.3 | 598.1 | 837.9 | 793.4 | 655.2 | 541.5 | 631 | |
| TOTAL | 21154 | 17841 | 15074 | 15225 | 12368 | 10495 | 13222 | 19598 | 18968 | 15030 | 12243 | 14898 | 186115 |

FIG.59

TIME ZONE BASIS CONTRACT FOR THIRD USER

| | SELL | | | | | | | | | | | | |
|---|---|---|---|---|---|---|---|---|---|---|---|---|---|
| | JANUARY | FEBRUARY | MARCH | APRIL | MAY | JUNE | JULY | AUGUST | SEPTEMBER | OCTOBER | NOVEMBER | DECEMBER | |
| BASIC RATE ¥1100 | | | | | | | | | | | | | |
| DAYTIME ~90kWh @¥20.65 | | | | | | | | | | | | | |
| 90~210 @¥27.28 | 38.22 | 356 | 1283 | 1377 | 2601 | 1918 | 1738 | 988.9 | 570.8 | 1042 | 1024 | 602 | |
| 210~ @¥29.90 | | | | | | | | | | | | | |
| NIGHTTIME 23:00~7:00 @¥6.78 | | | | | | | | | | | | | TOTAL |
| TOTAL | 38.22 | 356 | 1283 | 1377 | 2601 | 1918 | 1738 | 988.9 | 570.8 | 1042 | 1024 | 602 | 13538 |

ANNUAL PAYMENT 172577

SOLAR POWER GENERATION ADMINISTRATION SYSTEM, AND SOLAR POWER GENERATION ADMINISTRATION METHOD TO PROVIDE USEFUL INFORMATION TO USER

BACKGROUND OF THE INVENTION

1. Field of the Invention

The present invention relates to a solar power generator installed at one's residence and operated together with usage of commercial power, and particularly to the technique of supplying the user who has installed such a solar power generator with various services.

2. Description of the Background Art

During the past several years, there has been an intensive effort to review the energy resource from the standpoint of conserving a global environment. Solar cells utilizing solar energy hold promise as a clean energy resource. A solar power generator utilizing the power generated from such solar cells and commercial power together is known. When the required electricity for consumption cannot be covered by just the solar cells, the generator can supply the insufficient electricity from the commercial power.

The solar power generator requires maintenance in order to realize the predetermined electric generating capacity by the solar cells. Japanese Patent Laying-Open No. 11-206038 discloses an apparatus that collects information about the operation status of the solar power generator online to monitor any error.

The apparatus disclosed in this publication includes an inverter circuit converting the DC power generated by a solar cell array into AC power, a switch connected between the solar cell array and the inverter circuit and between the inverter circuit and a distribution board, a control circuit opening the switch when an error is detected in the solar cell array or inverter circuit, and a transmission/reception circuit connected to the control circuit and communication circuit to transmit error information related to the detected error to a predetermined organization through the communication line. The predetermined organization can access the control circuit through the communication line. The control circuit includes a circuit for the predetermined organization to collect the operation information of the solar power generator, and a circuit to stop the inverter circuit according to an instruction from the predetermined organization.

According to the apparatus disclosed in this publication, when an error is generated in the inverter circuit, the control circuit detects it and automatically opens the switch. Thus, a high level of safety can be ensured. The error information is automatically provided in real time to a predetermined organization such as a service company through the communication line. The service company can carry out maintenance promptly. The service company collects the operation information of the inverter circuit periodically or irregularly through the communication line to monitor any change in the production of electricity or indication of error. Thus, the service company can provide the user with a high level of security and service. Furthermore, in the case where a serious error occurs at the commercial power side, the service company can stop the inverter circuit through remote control via the communication line. Thus, a high level of security can be ensured.

Such a solar power generator is extremely expensive. Although the apparatus disclosed in the present publication can realize high security with respect to the solar power generator, the user's demand to recover in as short a period of time as possible the disbursement required for installing the solar power generator could not be satisfied.

SUMMARY OF THE INVENTION

An object of the present invention is to provide a solar power generation administration server and solar power generation administration method that can suppress generation of the expense of the user who has installed a solar power generator.

Another object of the present invention is to provide a solar power generation administration server and solar power generation administration method that allows the user who has installed a solar power generator to have the fee to be paid to the power company suppressed.

A further object of the present invention is to provide a solar power generation administration server and solar power generation administration method that can increase the electric energy produced by a solar power generator.

Still another object of the present invention is to provide a solar power generation administration server and solar power generation administration method that can detect and notify the user an error in a solar power generator.

A still further object of the present invention is to provide a solar power generation administration server and solar power generation administration method that can detect and notify the user an error in a solar power generator through comparison with another solar power generator.

According to an aspect of the present invention, a solar power generation administration server is employed in a solar power generation administration system including the solar power generation administration server and a solar power generator supplying commercial power and solar generated power to a load. The server includes a reception circuit receiving data of the solar generated power by the solar power generator and a quantity of power draw by the load, a production circuit connected to the reception circuit to produce notice information associated with the fee to be paid by the user who has installed the solar power generator to the power company supplying commercial power, based on the quantity of generated power and the quantity of power draw, and a transmission circuit connected to the production circuit to transmit the produced notice information to the solar power generator.

The solar power generation administration server can produce notice information based on the data of the quantity of generated power and the quantity of power draw received from the solar power generator by the reception circuit to transmit the notice information to the solar power generator. When the ratio of the quantity of power draw to the quantity of generated power is great, for example, notice information is produced so as to advise suppression of power draw. The solar power generator outputs the notice information transmitted from the solar power generation administration server so as to be acknowledged by the user. Thus, the user can suppress the power draw to reduce the electric power charge to be paid to the power company.

Further preferably, the solar power generator includes a circuit measuring the quantity of generated power, the quantity of power draw, the quantity of sell power to the power company supplying the commercial power, and the quantity of buy power by the power company, and a circuit transmitting the measured data to the solar power generation administration server. The reception circuit includes a circuit receiving data of the quantity of generated power, the quantity of power draw, the quantity of sell power and the quantity of buy power from the solar power generator. The production circuit includes a circuit storing data of a rate of sell power and a rate of buy power of the power company, and a circuit producing notice information that minimizes the fee to be paid to the power company by the user who has installed the solar power generator based on the data of the quantity of sell power, the quantity of buy power, the sell power rate and the buy power rate.

The solar power generation administration server calculates a rate of sell power based on the quantity of sell power to the power company and a rate of buy power based on the quantity of buy power from the power company. The power rate corresponds to the basic rate plus the used quantity of power multiplied by the unit cost. The power company has a plurality of contracts respectively differing in the basic rate and the unit cost. The solar power generation administration server can produce notice information recommending a contract with a power company so as to minimize the fee to be paid to the power company, which is the difference between the buy power rate and sell power rate.

Further preferably, the production circuit includes a circuit storing the sell power rate and buy power rate of a plurality of power companies, a circuit to select a power company from the plurality of power companies that minimizes the fee to be paid to the power company by the user who has installed the solar power generator, and a circuit producing notice information.

The solar power generation administration server can select the power company most advantageous to the user from a plurality of power companies.

Further preferably, the solar power generation administration server is connected to a plurality of solar power generators for communication therewith. The reception circuit includes a circuit receiving information representing the area where the solar power generator is installed, and the data of the quantity of power generated by the solar power generator and the quantity of power draw by the load. The production circuit includes a circuit calculating an average of the quantity of generated power by solar power generators installed at an area assumed to have the same hours of sunlight, based on the amount of power generated by a plurality of solar power generators, and a circuit producing notice information indicating that there is an error in the solar power generator whose quantity of generated power is below the average. The transmission circuit includes a circuit transmitting the produced notice information to the solar power generator whose quantity of generated power is below the average.

The solar power generation administration server calculates the average of the quantity of generated power by the solar power generators assumed to have the same hours of sunlight which is the most important factor in determining the quantity of power generated by sunlight. Determination is made that there is an error in the solar power generator whose quantity of generated power is below the average, so that notice information recommending maintenance can be produced.

According to another aspect of the present invention, a solar power generation administration method of a solar power generation administration server is provided, employed in a solar power generation administration system including the solar power generation administration server and a solar power generator supplying commercial power and solar generated power to a load. The solar power generation administration method includes the steps of receiving data of the quantity of power generated by the solar power generator and the quantity of power draw by the load from the solar power generator, producing notice information associated with the fee to be paid to the power company supplying commercial power by the user who has installed the solar power generator based on the received data of the quantity of generated power and power draw, and transmitting the produced notice information to the solar power generator.

The solar power generation administration method can produce notice information based on the data of the quantity of generated power and the quantity of power draw received from the solar power generator and transmit the produced notice information to the solar power generator. For example, when the ratio of the quantity of power draw to the quantity of generated power is great, the notice information is produced so as to advise suppression of power draw. The solar power generator outputs the notice information transmitted from the solar power generation administration server so as to be acknowledged by the user. Thus, the user can suppress power draw to reduce the electric power charge to be paid to the power company.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows data transmitted from a solar power generator to the solar power generation administration server.

FIG. 7 shows a user information administration database stored in a hard disk of the solar power generation administration server.

FIGS. 8–12 are flow charts of the control procedure of a notice information production process in the solar power generation administration server.

FIGS. 14–21 show examples of screens displayed at the display and operation unit of the solar power generator.

FIGS. 22 and 23 show the quantity of generated power on a monthly and time zone basis of a solar power generator.

FIGS. 24 and 25 show the quantity of power draw on a monthly basis and time zone basis for a first user who has installed a solar power generator.

FIGS. 26 and 27 show the quantity of buy power on a monthly basis and a time zone basis for the first user who has installed a solar power generator.

FIGS. 28 and 29 show the quantity of sell power on a monthly basis and a time zone basis of the first user who has installed a solar power generator.

FIG. 30 shows the rate of buy power on a monthly basis when the first user who has installed a solar power generator enters into contract A.

FIG. 31 shows the rate of sell power on a monthly basis when the first user who has installed a solar power generator enters into contract A.

FIG. 32 shows the rate of buy power on a monthly basis when the first user who has installed a solar power generator enters into contract B.

FIG. 33 shows the rate of sell power on a monthly basis when the first user who has installed a solar power generator enters into contract B.

FIG. 34 shows the rate of buy power on a monthly basis when the first user who has installed a solar power generator enters into contract on a time zone basis.

FIG. 35 shows the rate of sell power on a monthly basis when the first user who has installed a solar power generator enters into contract on a time zone basis.

FIGS. 36 and 37 show the quantity of power draw on a monthly basis and a time zone basis of a second user who has installed a solar power generator.

FIGS. 38 and 39 show the quantity of buy power on a monthly basis and a time zone basis for the second user who has installed a solar power generator.

FIGS. 40 and 41 show the quantity of sell power on a monthly basis and a time zone basis of the second user who has installed a solar power generator.

FIG. 42 shows the rate of buy power on a monthly basis when the second user who has installed a solar power generator enters into contract A.

FIG. 43 shows the rate of sell power on a monthly basis when the second user who has installed a solar power generator enters into contract A.

FIG. 44 shows the rate of buy power on a monthly basis when the second user who has installed a solar power generator enters into contract B.

FIG. 45 shows the rate of sell power on a monthly basis when the second user who has installed a solar power generator enters into contract B.

FIG. 46 shows the rate of buy power on a monthly basis when the second user who has installed a solar power generator enters into contract on a time zone basis.

FIG. 47 shows the rate of sell power on a monthly basis when the second user who has installed a solar power generator enters into contract on a time zone basis.

FIGS. 48 and 49 show the quantity of power draw on a monthly basis and a time zone basis of a third user who has installed a solar power generator.

FIGS. 50 and 51 show the quantity of buy power on a monthly basis and a time zone basis for the third user who has installed a solar power generator.

FIGS. 52 and 53 show the quantity of sell power on a monthly basis and a time zone basis of the third user who has installed a solar power generator.

FIG. 54 shows the rate of buy power on a monthly basis when the third user who has installed a solar power generator enters into contract A.

FIG. 55 shows the rate of sell power on a monthly basis when the third user who has installed a solar power generator enters into contract A.

FIG. 56 shows the rate of buy power on a monthly basis when the third user who has installed a solar power generator enters into contract B.

FIG. 57 shows the rate of sell power on a monthly basis when the third user who has installed a solar power generator enters into contract B.

FIG. 58 shows the rate of buy power on a monthly basis when the third user who has installed a solar power generator enters into contract on a time zone basis.

FIG. 59 shows the rate of sell power on a monthly basis when the third user who has installed a solar power generator enters into contract on a time zone basis.

DESCRIPTION OF THE PREFERRED EMBODIMENTS

Figure 1:
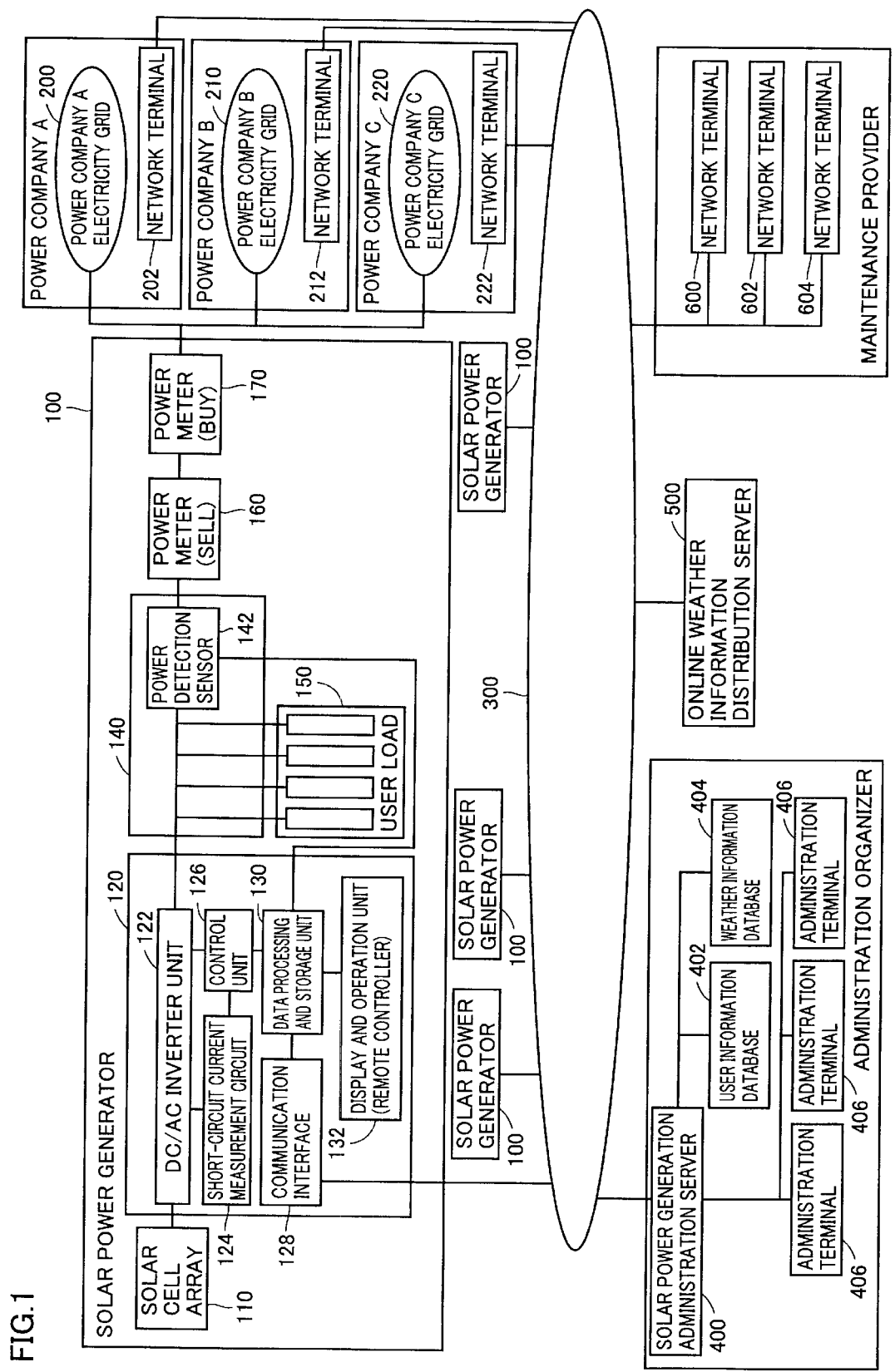
FIG. 1 shows an entire structure of a solar power generation administration system according to an embodiment of the present invention.

The embodiment of the present invention will be described with reference to the drawings. In the following description and drawings, corresponding components have the same reference characters allotted. Their labels and functions are identical. Therefore, detailed description thereof will not be repeated here.

The entire structure of a solar power generation administration system according to an embodiment of the present invention will be described with reference to FIG. 1. The solar power generation administration server includes a solar power generator 100 with a solar cell array 110 installed at the roof or the like of a user's house, a solar power generation administration server 400 producing notice information for each user and transmitting the produced notice information to solar power generator 100, an online weather information distribution server 500 transmitting information of the hours of sunlight for each area and each time zone to solar power generation administration server 400, network terminals 600–604 of a maintenance provider that dispatches a worker to the user's residence when notified of an error in solar power generator 100, and network terminals 202, 212 and 222 of respective power companies. These solar power generators 100, power company network terminals 202, 212, 222, solar power generation administration server 400, online weather information distribution server 500, and maintenance provider network terminals 600–604 are connected through a network 300 to transfer data with each other. The user selects one of a plurality of power companies to receive commercial power supply.

As shown in FIG. 1, solar power generator 100 includes a solar cell array 110 converting solar energy into electric energy, a power conditioner 120 connected to solar cell array 110 to convert the DC current generated at solar cell array 110 into AC current as well communicating with solar power generation administration server 400 through network 300, a switch 140 connected to power conditioner 120 to supply the power generated by solar cell array 110 and the commercial power supplied from a power company to a load, a user load 150 such as an electrical appliance connected to switch 140 and used by the user who has installed solar power generator 100, a meter 160 of sell power that measures the sell power to be sold to the power company from solar power generator 100, and a meter 170 of buy power that measures the buy power to be bought from the power company.

Power conditioner 120 includes a DC/AC inverter unit 122 converting the DC current generated at solar cell array 110 into AC current, a short-circuit current measurement circuit 124 connected to DC/AC inverter unit 122 to measure short-circuit current, a control unit 126 connected to DC/AC inverter unit 122 and short-circuit current measurement circuit 124 to control each component of power conditioner 120, a data processing and storage unit 130 connected to control unit 126 to process and store data, a communication interface 128 connected to data processing and storage unit 130 to communicate with solar power generation administration server 400 through network 300, and a display and operation unit (remote controller) 132 connected to data processing and storage unit 130 to request solar power generation administration server 400 to provide notice information and displaying the notice information received from solar power generation administration server 400.

Short-circuit current measurement circuit 124 responds to the control signal from control unit 126 to alter the input impedance so that the DC voltage applied to DC/AC inverter unit 122 is below 20 volts, and measures the value of the input current to DC/AC inverter unit 122 from solar cell array 110. The measured value of the input current is called the short-circuit current value. The short-circuit current value is proportional to the intensity of solar insolation. The generation of an error in solar cell array 110 and reduction in the amount of insolation towards solar cell array 110 can be detected by reduction in the short-circuit current value measured at the culminant time every day.

Data processing and storage unit 130 stores the data of the quantity of generated power, power draw, sell power, and buy power per one hour based on the control signal of control unit 120. The stored data of the quantity of generated power, power draw, sell power and buy power per hour are transmitted to solar power generation administration server 400 through communication interface 128 and network 300 based on a control signal from control unit 126. The measured data of the quantity of power per hour is transmitted to solar power generation administration server 400 at five past every hour.

Switch 140 includes a power detection sensor 142 connected to DC/AC inverter unit 120 and sell power meter 160 to measure the power consumed by user load 150.

Sell power meter 160 is connected to power detection sensor 142 and buy power meter 170 to measure the quantity of sell power to be sold to a power company. This measured quantity of sell power is equal to the quantity of generated power minus the quantity of power draw.

Buy power meter 170 is connected to sell power meter 160 and any of power company electricity grids 200, 210 and 220 to measure the quantity of buy power to be bought from any one of the power companies. This measured quantity of buy power is equal to the quantity of power draw minus the quantity of generated power.

Network terminals 202, 212 and 222 can effect data communication with power conditioner 120 of solar power generator 100 and solar power generation administration server 400 via network 300. These network terminals 202, 212 and 222 command control unit 126 of power conditioner 120 to stop DC/AC inverter unit 122 when receiving abnormal occurrence information from solar power generation administration server 400.

Solar power generation administration server 400 is connected to a user information database 402 storing information of users who have installed solar power generator 100, and to a weather information database 404 storing weather information of respective areas all over the country. Solar power generation administration server 400 is also connected to an administration terminal 406 installed at each area. Solar power generation administration server 400 receives the data of the hours of sunlight for each area on a time zone basis from online weather distribution server 500 and stores the received data in weather information database 404.

The processing performed by solar power generation administration server 400 of the present embodiment is realized by software executed on a computer such as a personal computer or a workstation.

Figure 2:
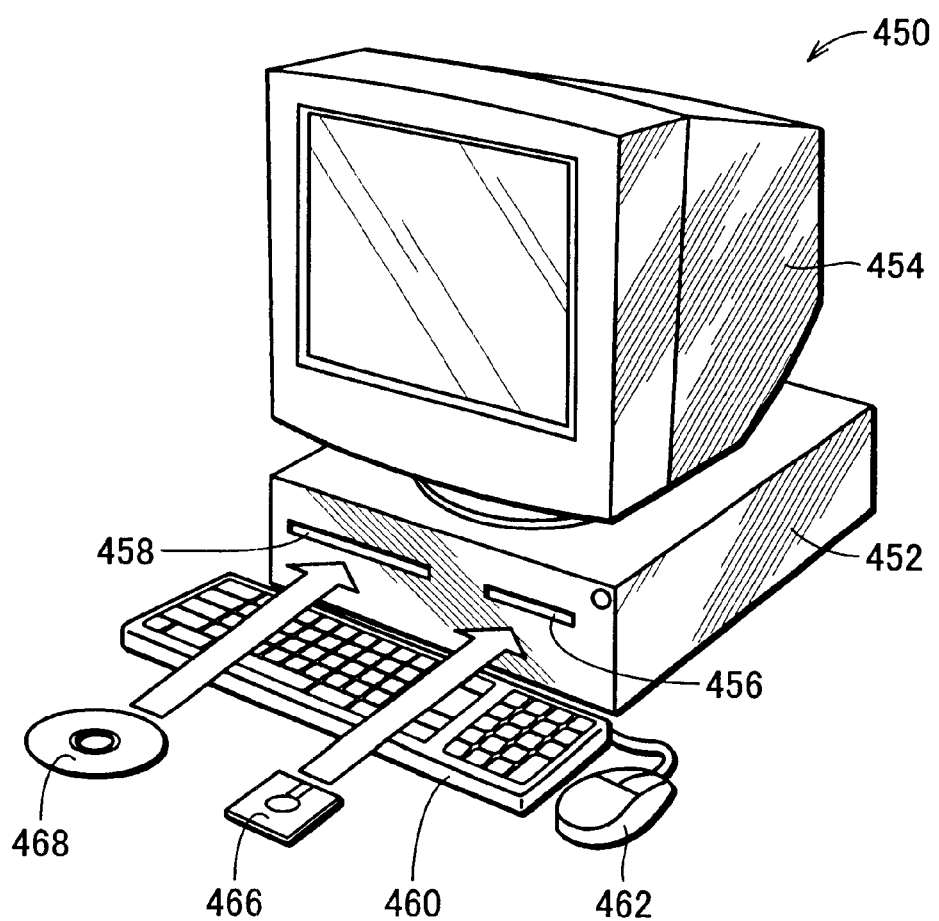
FIG. 2 shows an appearance of the computer realizing a solar power generation administration server.

FIG. 2 shows an appearance of a computer system that is an example of solar power generation administration server 400. Referring to FIG. 2, this computer system 450 includes a computer 452 with an FD (flexible Disk) drive device 456 and a CD-ROM (Compact Disc-Read Only Memory) drive device 458, a monitor 454, a keyboard 460 and a mouse 462.

Figure 3:
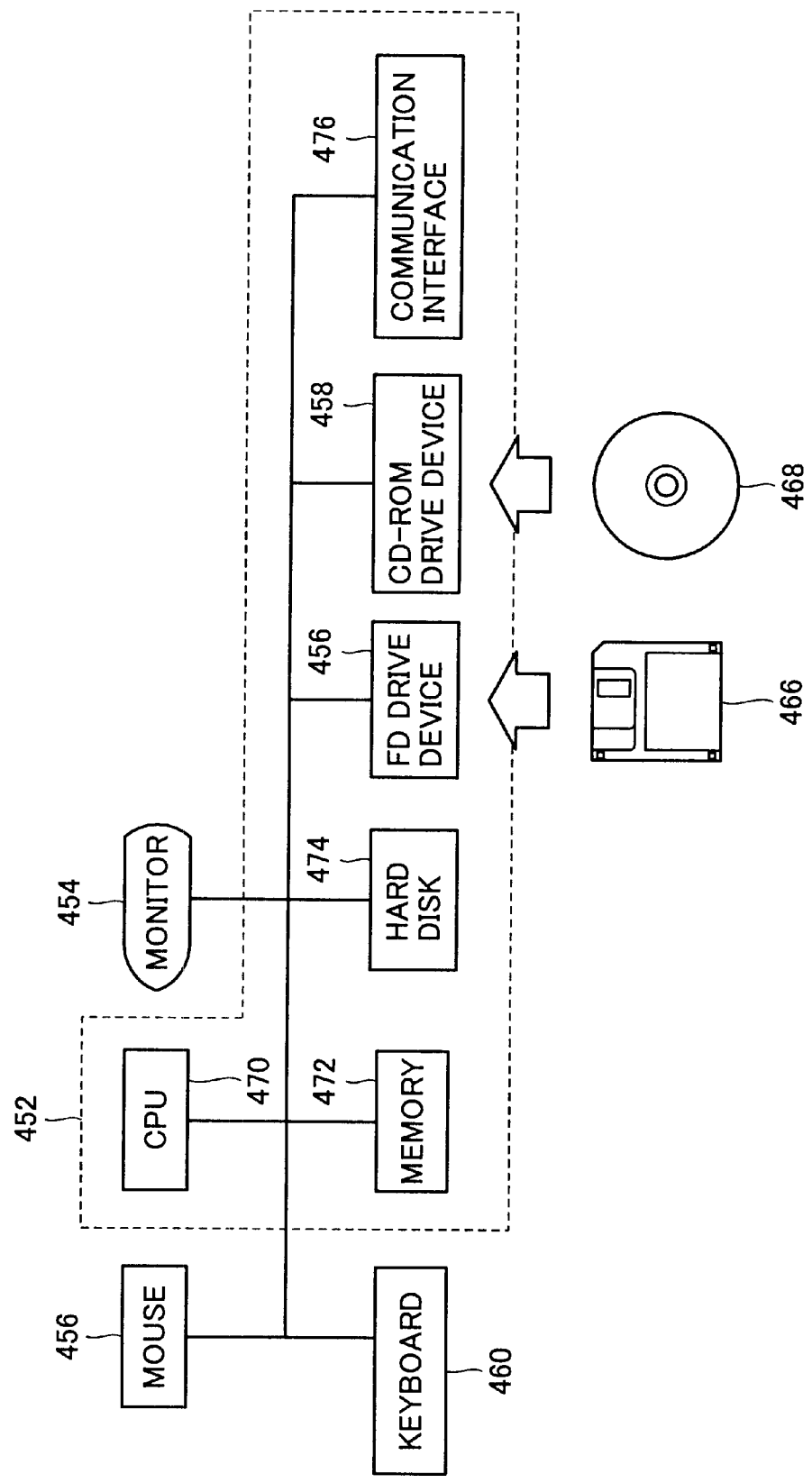
FIG. 3 is a control block diagram of the computer realizing the solar power generation administration server.

FIG. 3 is a block diagram of the structure of computer system 450. As shown in FIG. 3, computer 452 includes, in addition to the aforementioned FD drive device 456 and CD-ROM drive device 458, a CPU (Central Processing Unit) 470, a memory 472 and a hard disk 474 connected to each other through a bus. An FD 466 is set in FD drive device 456. A CD-ROM 468 is set in CD-ROM drive device 458.

As mentioned before, solar power generation administration server 400 is realized by computer hardware and software executed by CPU 470. In general, such a software is distributed in a stored manner in a recording medium such as FD 466 and CD-ROM 468 to be read out by FD drive device 456, CD-ROM drive device 458 or the like to be stored in hard disk 474. The software is read out from hard disk 474 to memory 472 to be executed by CPU 470. The hardware per se of the computer shown in FIGS. 2 and 3 is of the general type. Therefore, the essential portion of the present invention is the software recorded in a recording medium such as FD 466, CD-ROM 468 and hard disk 474.

Since the operation of the computer shown in FIGS. 2 and 3 is well known, detailed description thereof will not be repeated here.

Figure 4:
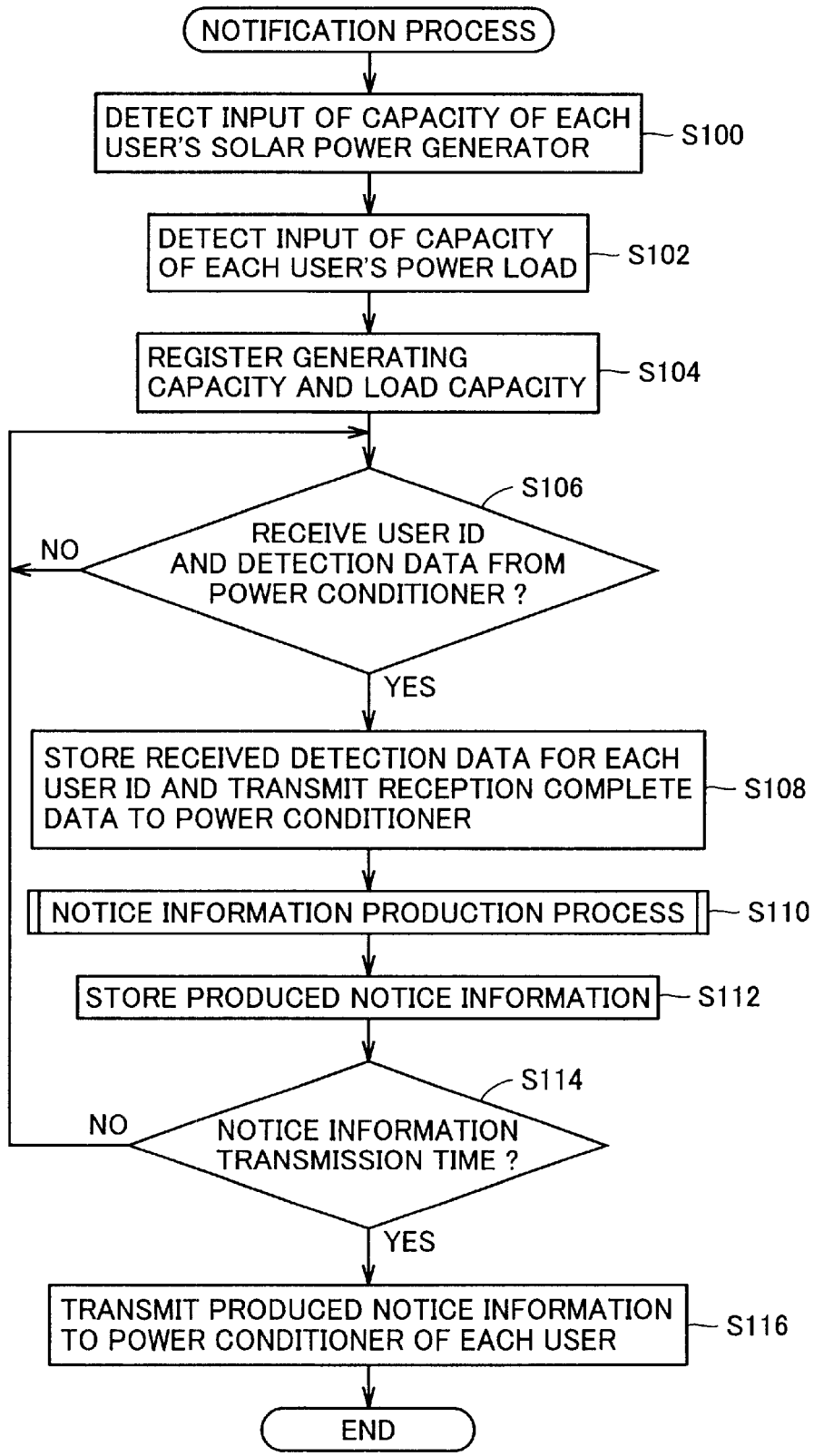
FIG. 4 is a flow chart of the control procedure of the notice process in the solar power generation administration server.

Referring to FIG. 4, the program executed by solar power generation administration server 400 is associated with a notice process, and has a control structure set forth below.

At step (step abbreviated as "S" hereinafter) 100, CPU 470 detects input of the rated generating capacity of the user's solar power generator 100 through keyboard 460 or the like. At S102, CPU 470 detects input of the user's load capacity input through keyboard 460 and the like.

At S104, CPU 470 registers the generating capacity and load capacity input at S100 and S102, respectively, to the user information administration database in hard disk 474. A user ID (identification) to identify the user and an area ID to identify the area where solar power generator 100 is installed are registered together with the capacity data. The area ID serves to identify the area where solar power generator 100 is installed. One ID is allotted on an area-by-area basis assumed to have the same insolation.

At S106, CPU 470 determines whether a user ID and detection data has been received from power conditioner 120 of solar power generator 100 through network 300. These data are transmitted from power conditioner 120 to solar power generation administration server 400 at five past every hour. Upon receiving the user ID and detection data from power conditioner 120 (YES at S106), control proceeds to S108, otherwise (NO at S106), waiting is conducted for reception of a user ID and detection data from power conditioner 120.

At S108, CPU 470 stores into the user information administration database in hard disk 474 the detection data for each user ID received at S106. CPU 470 transmits reception completion data to power conditioner 122. At S110, CPU 470 performs a notice information production process. Details of this notice information production process will be described afterwards. At S112, CPU 470 stores the notice information produced at S110 into hard disk 474.

At S114, CPU 470 determines whether the current time is the time to transmit notice information. When the current time is the time to transmit notice information (YES at S114), control proceeds to S116, and otherwise (NO at S114), control returns to S106. The transmission time is preset, and set to once a day or once for every six hours, for example.

At S116, CPU 470 transmits the produced notice information to power conditioner 120 of the user's solar power generator 100.

Figure 5:
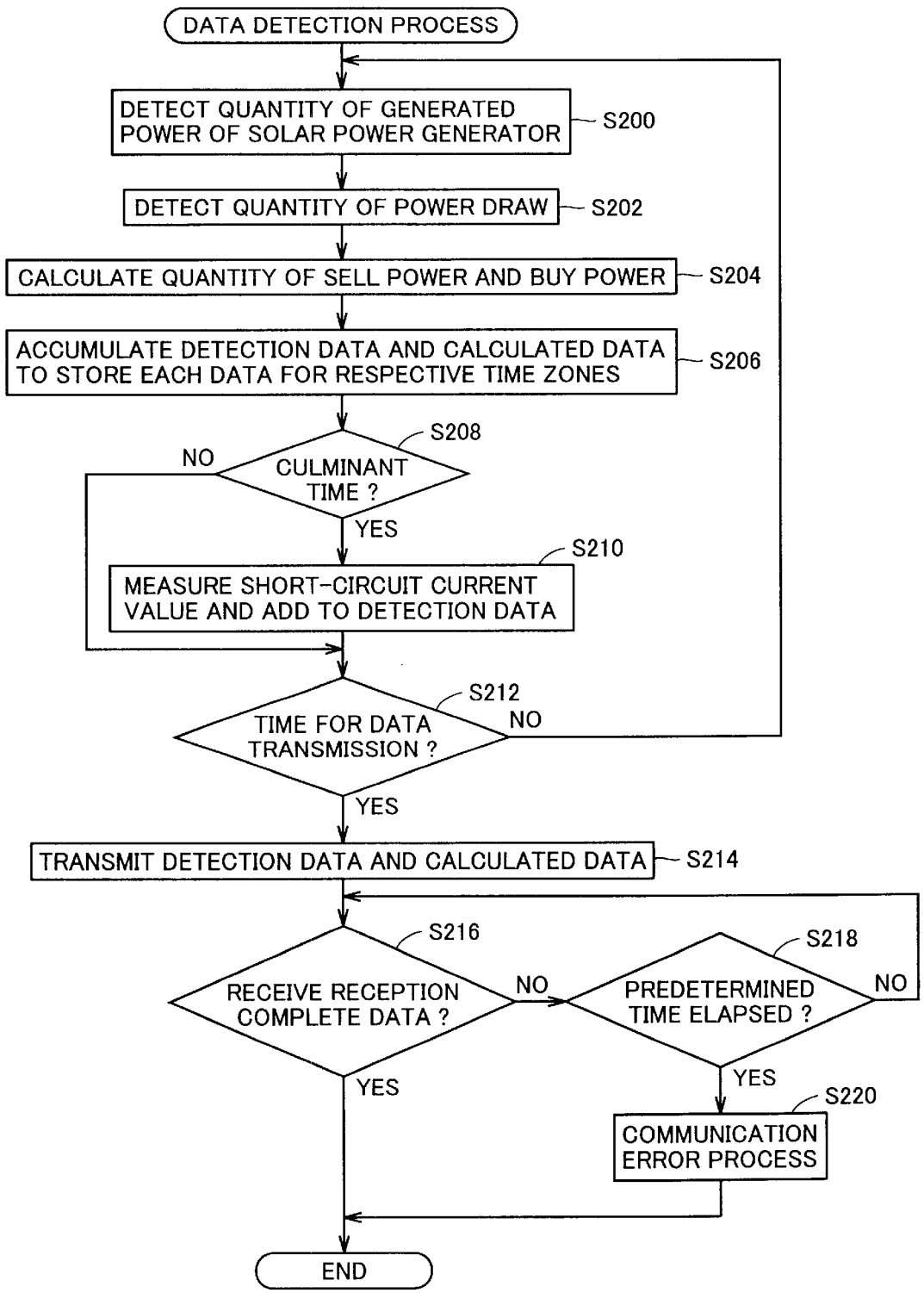
FIG. 5 is a flow chart of the control procedure of a data detection process of a solar power generator.

Referring to FIG. 5, the program executed by the solar power generator is associated with a data detection process, and has a control structure set forth below.

At S200, control unit 126 detects the quantity of power generated by solar power generator 100 via DC/AC inverter unit 122. At S202, control unit 126 detects the quantity of power draw by user load 150 via power detection sensor 142.

At S204, control unit 126 calculates the quantity of sell power and quantity of buy power. The quantity of sell power and quantity of buy power can be calculated based on the quantity of power detected by sell power meter 160 and buy power meter 170, respectively. As an alternative method of calculation, the quantity of sell power can be obtained by subtracting the quantity of power draw detected by power detection sensor 142 from the quantity of power generated by solar power generator 100, whereas the quantity of buy power can be obtained by subtracting the quantity of power generated by solar power generator 100 from the quantity of power draw detected by power detection sensor 142. Calculation of the quantity of sell power and buy power can be achieved by any of the aforementioned manner.

At S206, control unit 126 accumulates the detected data and calculated data to store the quantity of generated power, power draw, sell power and buy power for each time zone.

At S208, control unit 126 determines whether the current time is the culminant time. Data processing and storage unit 130 of solar power generator 100 stores the culminant time of the area where solar power generator 100 is installed. When the current time is the culminant time based on the stored culminant time and current time (YES at S208), control proceeds to S210, otherwise (NO at S208), control proceeds to S212.

At S210, control unit 126 measures the value of the short-circuit current applied from solar cell array 110 to DC/AC inverter unit 122 through short-circuit current measurement circuit 124, which is added to the detection data.

At S212, control unit 126 determines whether the current time is the time for data transmission. It is assumed that the time for data transmission is set at five past every hour. When the current time is the time for data transmission (YES at S212), control proceeds to S210, and otherwise (NO at S212), control returns to S200 where the detection data and calculated data are accumulated. The quantity of generated power, power draw, sell power and buy power are stored for each time zone.

At S214, control unit 126 transmits the detection data and calculated data stored in data processing and storage unit 130 to solar power generation administration server 400 via communication interface 128 and network 300.

At S216, control unit 126 determines whether the reception completion data has been received from solar power generation administration server 400. When the reception completion data has been received from solar power generation administration server 400 (YES at S126), the data detection process ends, and otherwise (NO at S216), control proceeds to S218.

At S218, control unit 126 determines whether a predetermined time has elapsed from transmission of the detection data and calculated data to solar power generation administration server 400. When a predetermined time has elapsed from the transmission of the detection data and calculated data (YES at S218), control proceeds to S220 to carry out a communication error process. When the predetermined time has not elapsed (NO at S218), control returns to S216 to wait for the reception completion data from solar power generation administration server 400.

The structure of communication data transmitted from power conditioner 120 of solar power generator 100 to solar power generation administration server 400 will be described with reference to FIG. 6. The data transmitted at five past every hour from solar power generator 100 to solar power generation administration server 400 includes a communication header, user ID, generated power quantity data for each hour, power draw quantity data for each hour, buy power quantity data for each hour, sell power quantity data for each hour and short-circuit current data. The short-circuit current data is transmitted only at the time zone including the culminant time.

The user information administration database stored in hard disk 474 of solar power generation administration server 400 will be described with reference to FIG. 7. The user information administration database includes a registration data area storing the user ID and area ID registered at S104 of FIG. 4, the area of generated power storing the past record of the generated power, the area storing abnormal detection information, the area storing the past record of power draw, the private power generation ratio area storing the past record of the ratio of the generated power to power draw (private power generation ratio), the area storing the past record of sell power, the area storing the past record of buy power, the time zone basis generated power storage area accumulating the generated power on a time zone basis for each month, the area storing power draw on a time zone basis corresponding to accumulation of the power draw on the time zone basis for every month, the area storing buy power on a time zone basis corresponding to accumulation of buy power on a time zone basis for every month, the area storing sell power on a time zone basis corresponding to accumulation of the sell power on a time zone basis for every month, an electric power charge area storing the electric power charge calculated based on a contract with power company A, and another electric power charge area storing the electric power charge calculated based on a contract with power company B.

The registration data storage area includes a user ID to identify the user who has installed solar power generator 100, an area ID to identify the area where solar power generator 100 is installed, data representing the type of solar cell array 110, data representing the type of power conditioner 120, data representing the generating capacity of solar cell array 110, data representing the load capacity of user load 150, and the last time of receiving data from power conditioner 120.

The generated power storage area includes the quantity of generated power last received from power conditioner 120, data accumulating the received quantity of generated power on a daily basis, and data accumulating the received generated power on a monthly basis.

The abnormal detection information storage area includes an average of the quantity of generated power at the area with the same area ID, the quantity of solar insolation for every area ID received from online weather information distribution server 500, the calculable quantity of generating power calculated based on the solar insolation, the value of short-circuit current received from power conditioner 120, and the average value of the short-circuit current value at the area with the same area ID.

Occurrence of an error is detected when the received data of the quantity of generated power is below (for example at least 20% lower than) the average value of the quantity of generated power at the area with the same area ID. Occurrence of an error is also detected when the received data of the quantity of generated power is below (for example at least 20% lower than) the calculable quantity of generating power of the area with the same area ID. Occurrence of an error is also detected when the received data of short-circuit current is below (for example, at least 20% lower than) the average value of the short-circuit current in the area with the same area ID.

The power draw storage area includes the power draw data last received from power conditioner 120, data corresponding to accumulation of the received power draw on a daily basis, and data corresponding to accumulation of the received power draw on a monthly basis.

The private power generation ratio storage area includes data representing the monthly average of the private power generation ratio, data representing the monthly average of the private power generation ratio of solar power generator 100 at the area with the same area ID, and data representing the ranking of the user's private power generation ratio.

The sell power storage area includes data of sell power last received from power conditioner 120, data corresponding to accumulation of the received sell power on a daily basis, and data corresponding to accumulation of the received sell power on a monthly basis.

The buy power storage area includes data of the buy power last received from power conditioner 120, data corresponding to accumulation of the received buy power on a daily basis, and data corresponding to accumulation of the received buy power on a monthly basis.

The time zone basis generated power storage area, the time zone basis power draw storage area, time zone basis buy power storage area and time zone basis sell power storage area store respective data for every time zone.

The power company electric power charge storage area stores the electric power charge calculated based on the quantity of sell power and quantity of buy power for respective contracts between the user and a power company. For example, the electric power charge calculated based on three contracts, i.e., contract A, contract B, and a contract on a time zone basis, are stored as to the electric power charge for power company A.

The time zone basis generated power, time zone basis power draw, time zone basis buy power and time zone basis sell power have the data accumulated for every time zone for one month, and that data of each month is stored for twelve months.

Referring to FIG. 8, the notice information production process of S110 in FIG. 4 has a control structure set forth below. The notice information production process can be performed after receiving the data of 24 hours of the previous day at five past every hour, or for every two to three hours.

At S120, CPU 470 stores the quantity of generated power, power draw, buy power and sell power for every time zone based on the received data. Here, these data are stored in the user information database (FIG. 7). At S122, CPU 470 accumulates the data of the quantity of generated power, power draw, buy power and sell power of that day based on the received data.

At S124, CPU 470 extracts the users with the same area ID to calculate the average value of the accumulated quantity of generated power for each area. At this stage, CPU 470 calculates the quantity of generated power per 1 kW of the rated generating capacity by dividing the accumulated quantity of generated power by the rated generating capacity for each user. CPU 470 calculates the average value of each area (this average value is called the average value of the accumulated quantity of generated power) based on the calculated quantity of generating power. CPU 470 stores the calculated average value of the accumulated quantity of generated power into the abnormal detection information storage area of the user information database (FIG. 7). At S126, CPU 470 retrieves the user ID of a solar power generator 100 whose quantity of generated power is at least 20% below the average value.

At S128, CPU 470 produces information indicating the possibility of an error occurring at solar power generator 100 as the notice information for the identified user. CPU 470 stores the produced information in hard disk 474.

Figure 9:
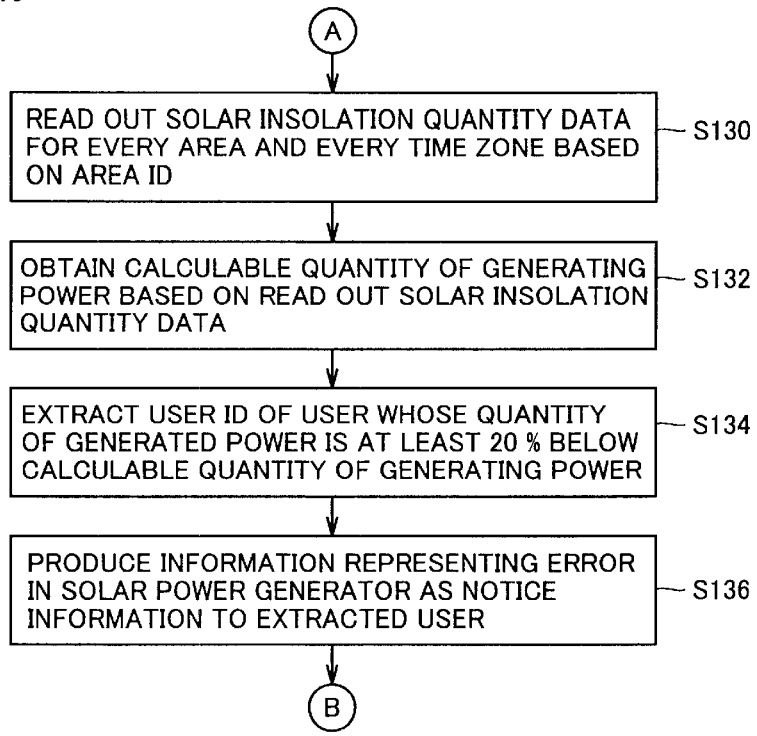

Referring to FIG. 9, at S130, CPU 470 reads out the data of insolation for each area and each time zone, based on the area ID from the user information database (FIG. 7). The insolation data for respective areas and respective time zones are transmitted to solar power generation administration server 400 from online weather information distribution server 500.

At S132, CPU 470 obtains the calculable quantity of generating power based on the insolation data read out at S130. CPU 470 obtains the calculable quantity of generating power, calculated based on the solar insolation data for respective areas. CPU 470 calculates the calculable quantity of generated power per 1 kW of the rated generating capacity. CPU 470 stores the obtained calculable quantity of generating power in the abnormal detection information storage area of the user information database (FIG. 7).

At S134, CPU 470 retrieves the user ID of a solar power generator 100 whose received data of the quantity of generated power is at least 20% below the calculated quantity of generating power. At S136, CPU 470 produces information representing the possibility of an error at solar power generator 100 as the notice information for the retrieved user. CPU 470 stores the produced information in hard disk 474.

Figure 10:
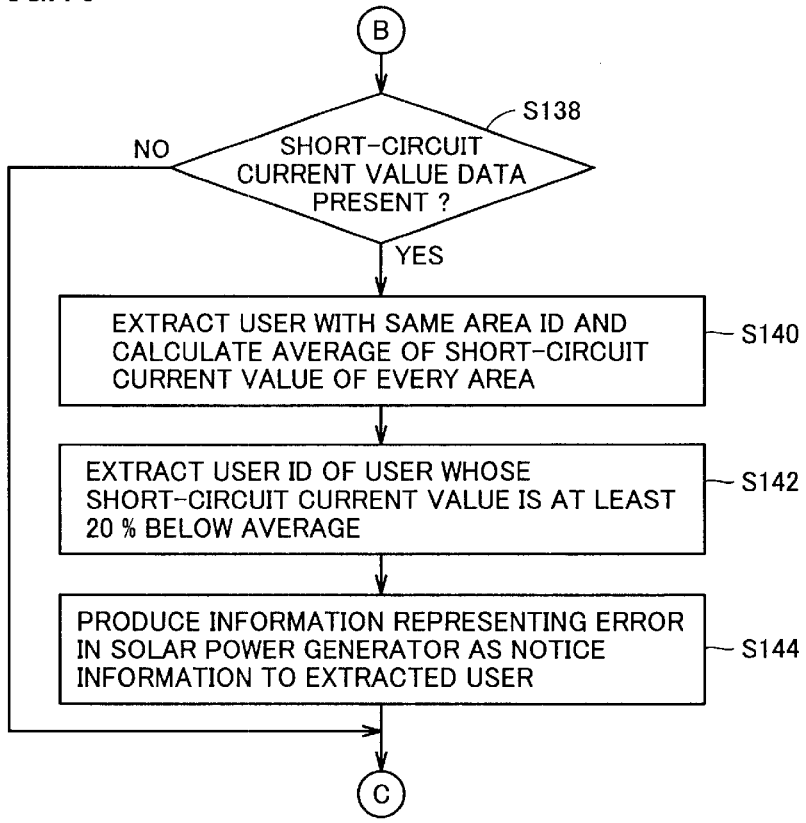

Referring to FIG. 10, at S138, CPU 470 determines whether the received data includes a short-circuit current value. When data of a short-circuit current value is included (YES at S138), control proceeds to S140, otherwise (NO at S138), control proceeds to S146 of FIG. 11.

At S140, CPU 470 extracts the user ID of users with the same area ID to calculate the average value of the short-circuit current values for each area. CPU 470 divides the short-circuit current value by the rated generating capacity for each user to calculate the short-circuit current value per 1 kW of the rated generating capacity. CPU 470 obtains the average value for each area based on the calculated short-circuit current value (this average value is called the short-circuit current average value). CPU 470 stores the calculated short-circuit current average value into the abnormal detection information storage area of the user information database (FIG. 7).

At S142, CPU 470 retrieves the user ID of the solar power generator 100 whose received short-circuit current value is at least 20% below the calculated short-circuit current average value. At S144, CPU 470 produces information representing the possibility of an error at solar power generator 100 as the notice information for the retrieved user. CPU 470 stores the produced information in hard disk 474. It is also possible to detect change in the short-circuit current value over time for each user and produce information representing the possibility of an error at solar power generator 100 based on the detected change.

Figure 11:
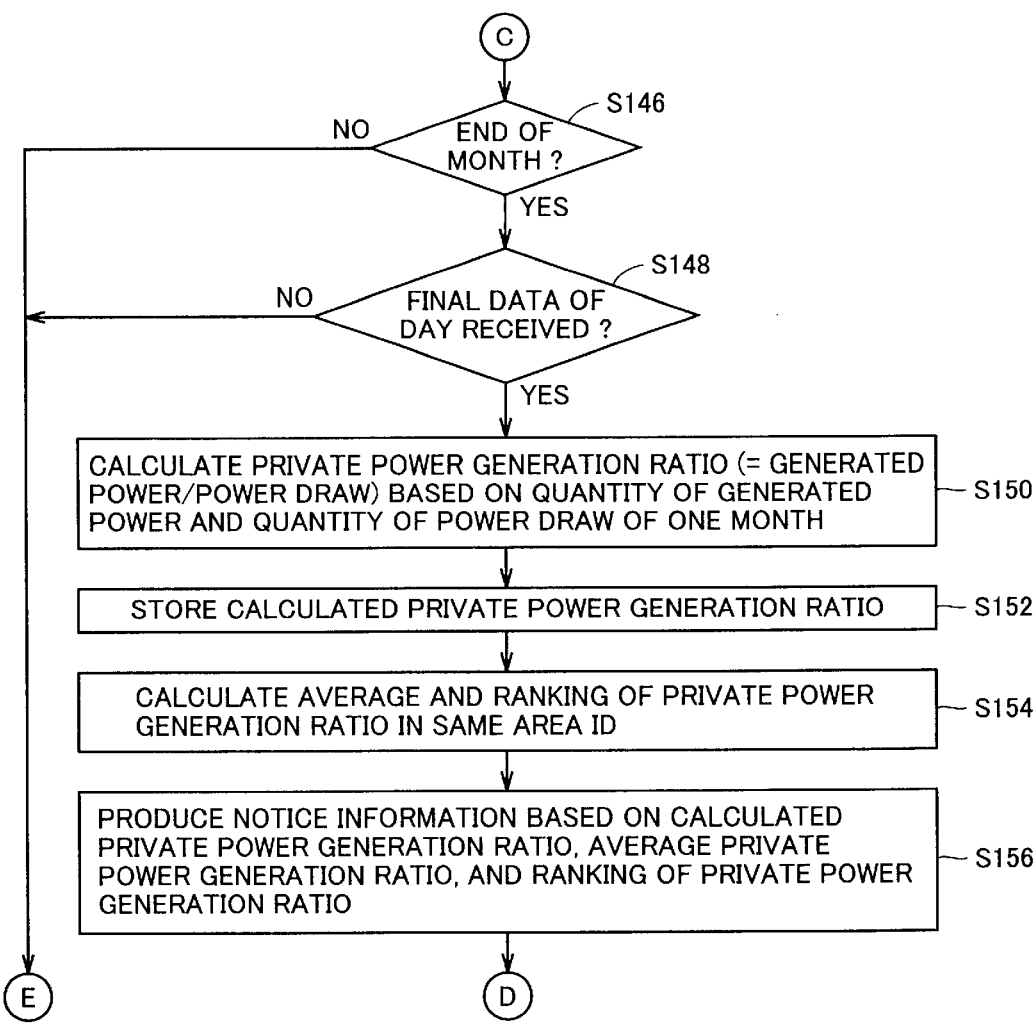

Referring to FIG. 11, at S146, CPU 470 determines whether the current date is at the end of the month. When the current date is at the end of the month (YES at S146), control proceeds to S148, otherwise (NO at S146), the notice information production process ends.

At S148, CPU 470 determines whether the month-end final data has been received. More specifically, by receiving the data of 23:00 to 24:00 of the end of the month at 0:05 of the next day, the process of S150–S156 set forth below is carried out. Upon receiving the month-end final data (YES at S148), control proceeds to S150, otherwise (NO at S148), this notice information production process ends.

At S150, CPU 470 calculates the private power generation ratio (=quantity of generated power/quantity of power draw) based on the quantity of generated power and quantity of power draw for one month. At S152, CPU 470 stores the calculated private power generating ratio into the private power generation ratio storage area in the user information database (FIG. 7).

At S154, CPU 470 calculates the average value of the private power generation ratio at the area with the same area ID based on the calculated private power generation ratio. CPU 470 calculates the ranking of the user for each area ID based on the calculated private power generation ratio. The calculated average value of the private power generation ratio and the user's ranking based on the private power generation ratio are stored in the private power generation ratio storage area in the user information database (FIG. 7).

At S156, CPU 470 produces notice information based on the calculated private power generation ratio, the average value of the private power generation ratio, and private power generation ratio ranking.

Figure 12:
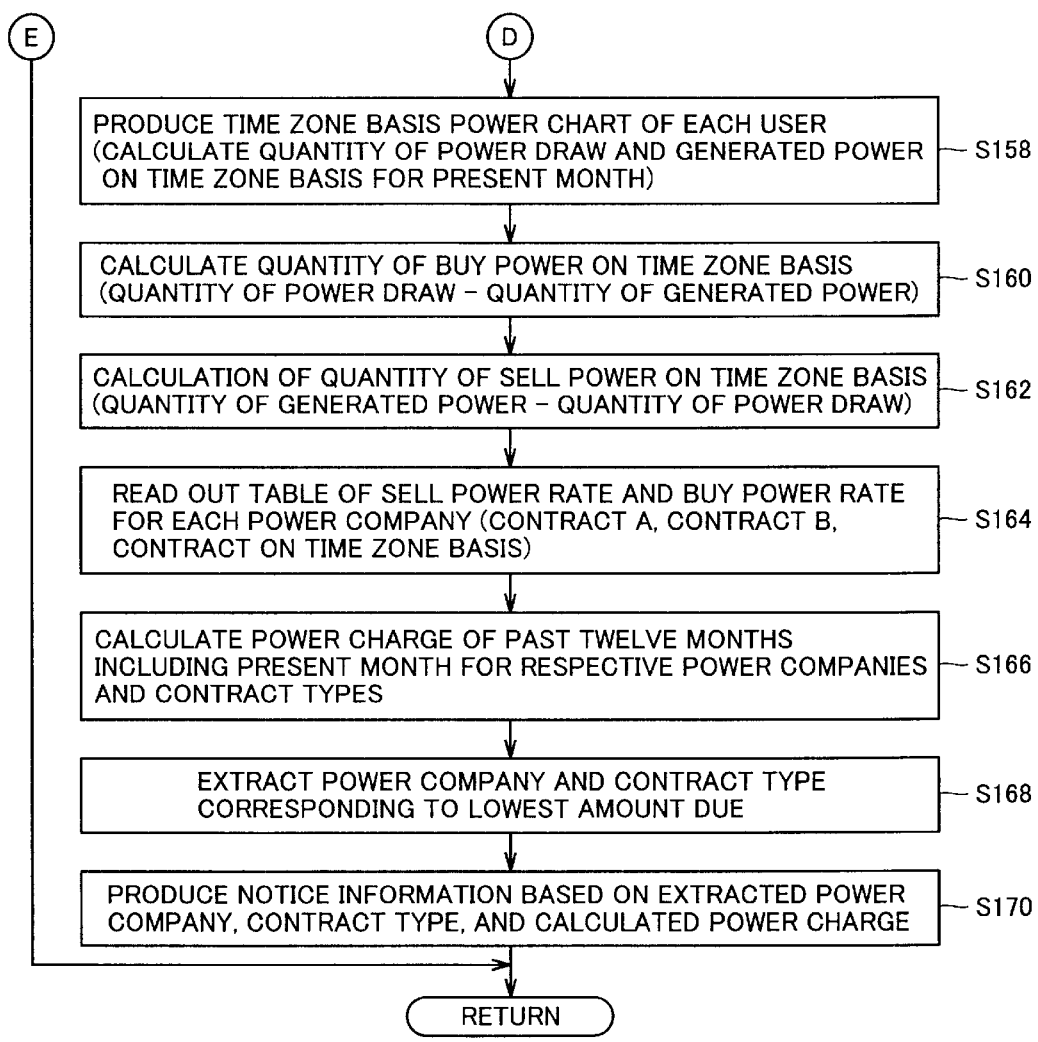

At S158 in FIG. 12, CPU 470 produces a time zone basis power chart for each user. This chart includes the power draw and generated power for each time zone.

At S160, CPU 470 calculates the quantity of buy power for each time zone. The quantity of buy power for each time zone can be calculated by subtracting the quantity of generated power from the quantity of power draw for each time zone, or based on the buy power for each time zone stored in the time zone basis buy power storage area in the user information database (FIG. 7).

At S162, CPU 470 calculates the quantity of sell power for each time zone. The quantity of sell power for each time zone can be calculated by subtracting the quantity of power draw from the quantity of generated power for each time zone, or by reading out the time zone basis sell power stored in the time zone basis sell power storage area in the user information database (FIG. 7).

At S164, CPU 470 reads out the buy/sell rate table for each power company. This buy/sell rate table for each power company is prestored in hard disk 474. This buy/sell rate table for each power company is received by solar power generation administration server 400 from network terminals 202, 212 and 222 of respective power companies. Network terminals 202, 212 and 222 of the power companies transmit the buy/sell rate table to solar power generation administration server 400 every time the power rate is altered.

The following description is based on the three contracts of contract A mainly for domestic households, contract B mainly for business organizations, and a time zone basis contract with the unit cost of the electric power charge differing for each time zone. It is assumed that the user selects any one of these contracts to enter into contract with a power company.

At S166, CPU 470 calculates the electric power charge for the past twelve month including the present month classified into power companies and contract types. At S168, CPU 470 identifies the power company and contract type with the lowest cost corresponding to the fee to be paid to the power company for the buy power minus the price amount to be received from the power company for the sell power.

At S170, CPU 470 produces notice information based on the identified power company, type of contract, and calculated electric power charge.

Figure 13:
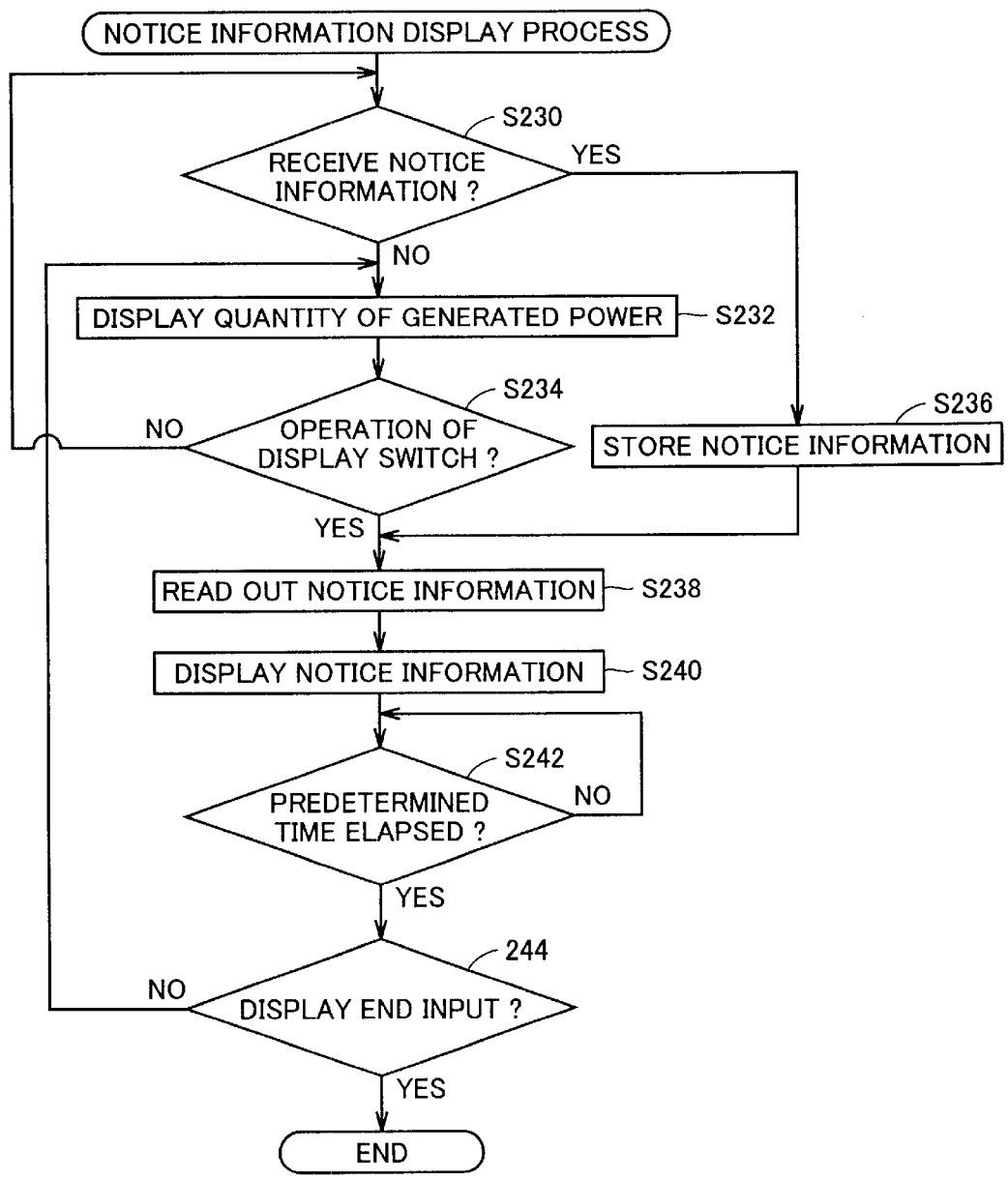
FIG. 13 is a flow chart of the control procedure of a notice information display procedure of a solar power generator.

Referring to FIG. 13, the program executed by solar power generator 100 is associated with a notice information display process, and has a control structure set forth below.

At S230, control unit 126 determines whether notice information has been received from solar power generation administration server 400. When notice information is received from solar power generation administration server 400 (YES at S230), control proceeds to S236, and otherwise (NO at S230), control proceeds to S232.

At S232, control unit 126 displays the quantity of generated power on display and operation unit 132. This quantity of generated power is the power quantity detected by control unit 126 via DC/AC inverter unit 122.

At S234, control unit 126 determines whether a display switch operation has been effected at display and operation unit 132. When a display switch operation has been effected at display and operation unit 132 (YES at S234), control proceeds to S238, and otherwise (NO at S234), control returns to S230 where determination is made whether notice information has been received from solar power generation administration server 400.

At S236, control unit 126 stores the received notice information in data processing and storage unit 130. At S238, control unit 126 reads out the stored notice information. At S240, control unit 126 displays the read out notice information on display and operation unit 132.

At S242, control unit 126 determines whether a predetermined time has elapsed from the display of the notice information on display and operation unit 132. When the predetermined time has elapsed from the display of the notice information (YES at S242), control proceeds to S244, otherwise (NO at S242), control returns to S242 to wait for the elapse of the predetermined time.

At S244, control unit 126 determines whether a display end input has been effected on display and operation unit 132. When a display end input has been effected at display and operation unit 132 (YES at S244), the notice information display process ends, and otherwise (NO at S244), control returns to S232 to switch the display from the notice information to the quantity of generated power.

The operation of the solar power generation administration system based on the above structure and flow charts will be described hereinafter.

Data Detection Operation of Power Conditioner

Power conditioner 120 detects the quantity of generated power by solar power generator 100 and the quantity of power draw by user load 150 through DC/AC inverter unit 122 and power detection sensor 142 (S200, S202). Based on the detected quantity of generated power and power draw, power conditioner 120 calculates the quantity of sell power and quantity of buy power (S204). The quantity of generated power, power draw, sell power and buy power are accumulated for each time zone and stored in data processing and storage unit 130.

When the current time is the culminant time (YES at S208), control unit 126 uses short-circuit current measurement device 124 to measure the value of input current (short-circuit current value) from solar cell array 110 to DC/AC inverter unit 122, which is added to the detection data (S210).

When the current time is 5 minutes after the hour (YES at S212), power conditioner 120 uses communication interface 128 to transmit the detection data and calculated data to solar power generation administration server 400 (S214). Upon receiving the reception completion data from solar power generation administration server 400 (YES at S216), power conditioner 120 ends the data detection operation. Otherwise (NO at S216), a communication error process will be carried out (S220).

Notice Operation by Solar Power Generation Administration Server

Solar power generation administration server 400 has the rated generating capacity of solar power generator 100 and the load capacity of user load 150 registered in the user information database (FIG. 7) for each user as the initial setting (S104). Data such as the user ID and area ID are registered in the user information database (FIG. 7).

Upon receiving the user ID and detection data from power conditioner 120 at five past every hour (YES at S106), solar power generation administration server 400 stores the received detection data classified into user IDs into the user information database (FIG. 7). Solar power generation administration server 400 transmits the reception completion data to power conditioner 120 that has transmitted the user ID and detection data (S108).

Solar power generation administration server 400 produces notice information based on the received data (S110). At the time of transmitting notice information (YES at S114), the produced notice information is transmitted to power conditioner 120 of the appropriate user (S116).

Notice Information Production Operation

Solar power generation administration server 400 stores the quantity of generated power, power draw, buy power and sell power for each time zone based on the data received at five past every hour, and accumulates respective data on a daily and monthly basis (S120, S122). Solar power generation administration server 400 retrieves the users with the same area ID to calculate the average value of the accumulated quantity of generated power at the area with the same area ID (S124). Solar power generation administration server 400 identifies the user ID of a solar power generator 100 whose accumulated value of the received quantity of generated power is at least 20% below the calculated average value (S126). Information indicating the possibility of an error in solar power generator 100 is produced as the notice information for the identified user (S128).

Solar power generation administration server 400 reads out the insolation data for respective areas and time zones from hard disk 474, based on the area ID (S130). The quantity of generating power based on calculation is obtained according to the read out insolation data (S132). Solar power generation administration server 400 identifies the user ID of a solar power generator whose accumulated value of the received quantity of generated power is at least 20% below the calculable quantity of generating power (S134). Information indicating the possibility of an error in solar power generator 100 is produced as the notice information for the identified user (S136).

When a short-circuit current value is included in the data received by solar power generation administration server 400 from power conditioner 120 (YES at S138), solar power generation administration server 400 searches for users with the same area ID to calculate the short-circuit current average value for each area (S140). Solar power generation administration server 400 identifies the user ID of a solar power generator whose received short-circuit current value is at least 20% below the calculated short-circuit current average value (S142). Information indicating the possibility of an error in solar power generator 100 is produced as the notice information for the identified user ID (S144).

Upon receiving the month-end final data (YES at S146, YES at S148), solar power generation administration server 400 calculates the private power generation ratio (=quantity of generated power/quantity of power draw) based on the quantity of generated power and power draw of one month (S150). Solar power generation administration server 400 calculates the average value of the private power generation ratio of the same area ID and the ranking of the private power generation ratio based on the calculated private power generation ratio for each user (S154). Solar power generation administration server 400 produces notice information for each user based on the calculated private power generation ratio, the average value of the private power generation ratio, and the private power generation ratio ranking (S156).

Upon receiving the month-end final data, solar power generation administration server 400 produces a time zone basis power chart for each user (S158). Solar power generation administration server 400 calculates the quantity of buy power and sell power for respective time zones (S160, S162). Solar power generation administration server 400 reads out the buy/sell rate table for respective power companies from hard disk 474 (S164), and calculates the electric power charge of the past 12 months including the present month classified into power companies and contract types (S166). Solar power generation administration server 400 identifies the power type of the power company with the lowest amount to be paid (S168). Notice information based on the identified contract type of a power company and calculated electric power charge is produced (S170).

Notice information Display Operation of Power Conditioner

Until notice information is received from solar power generation administration server 400 (NO at S230), the quantity of generated power is displayed on display and operation unit 132 of power conditioner 120 (S232). Upon effecting a display switch operation at display and operation unit 132 (YES at S234) or receiving notice information from solar power generation administration server 400 (YES at S230), notice information is read out from data processing and storage unit 130 (S238) and displayed on display and operation unit 132 (S240). At an elapse of a predetermined time from the display of the notice information (YES at S242), a display end input is entered at display and operation unit 132 (YES at S244), whereby the notice information display operation ends.

Referring to FIGS. 14–21, display examples of notice information and the like on display and operation unit 132 of power conditioner 120 will be described.

Referring to FIG. 14, when notice information is not received (NO at S230), the quantity of generated power and the like are displayed on display and operation unit 132 of power conditioner 120 (S232). At this stage, display and operation unit 132 provides the display of the quantity of generated power, quantity of power draw, quantity of buy power, quantity of sell power, quantity of generated power of the current month, quantity of generated power of the current year, the total of the quantity of generated power starting from installation of the solar power generator, and the amount of carbon dioxide emission that was reduced if the same total amount was generated by a thermal power station. The data such as the quantity of generated power displayed here is calculated by control unit 126 of power conditioner 120 based on the data received by DC/AC inverter unit 122, power detection sensor 142, sell power meter 160 and buy power meter 170. The data required for the calculation of converting the quantity of generated power into the quantity of carbon dioxide is stored in data processing and storage unit 130.

When notice information is received from solar power generation administration server 400 (YES at S230) or when a display switch operation is effected at display and operation unit 132 during the display of the quantity of generated power (YES at S232), notice information is displayed.

Referring to FIG. 15, the user identified to have the quantity of generated power of solar power generator 100 at least 20% below the average value in the same area ID has the notice information displayed recommending confirming whether there is an error in solar cell array 110. At the current stage, the current quantity of generated power and the average value of the quantity of generated power in this area are displayed on display and operation unit 132.

Figure 16:
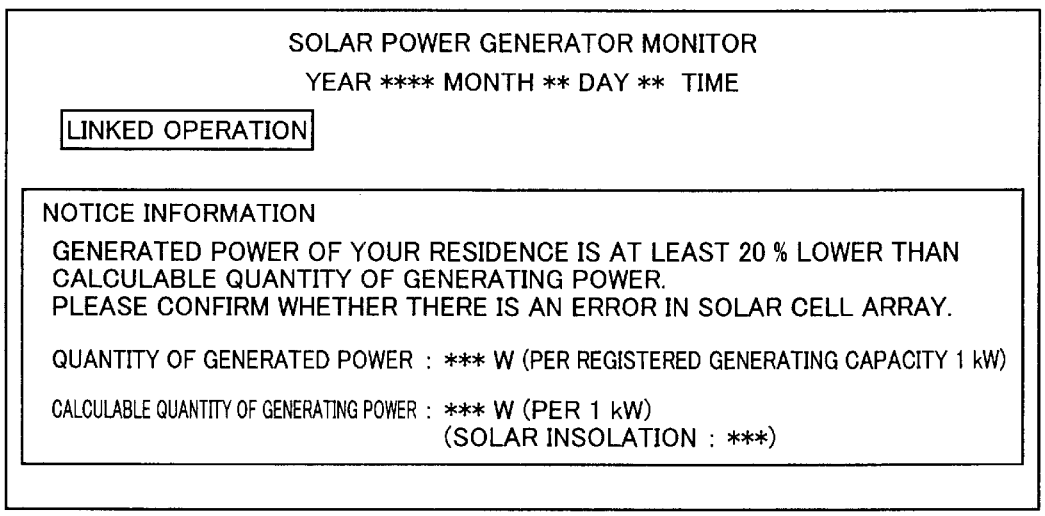

Referring to FIG. 16, the user identified to have the quantity of generated power at least 20% below the calculable quantity of generating power has notice information displayed advising confirmation of whether there is an error in solar cell array 110. The calculable quantity of generating power is based on calculation according to the insolation data for each area and each time zone received from online weather information distribution server 500. At the current stage, the quantity of generated power, the calculable quantity of generating power of this area, and insolation data that is the basis of calculation of the quantity of generated power are displayed on display and operation unit 132.

Figure 17:
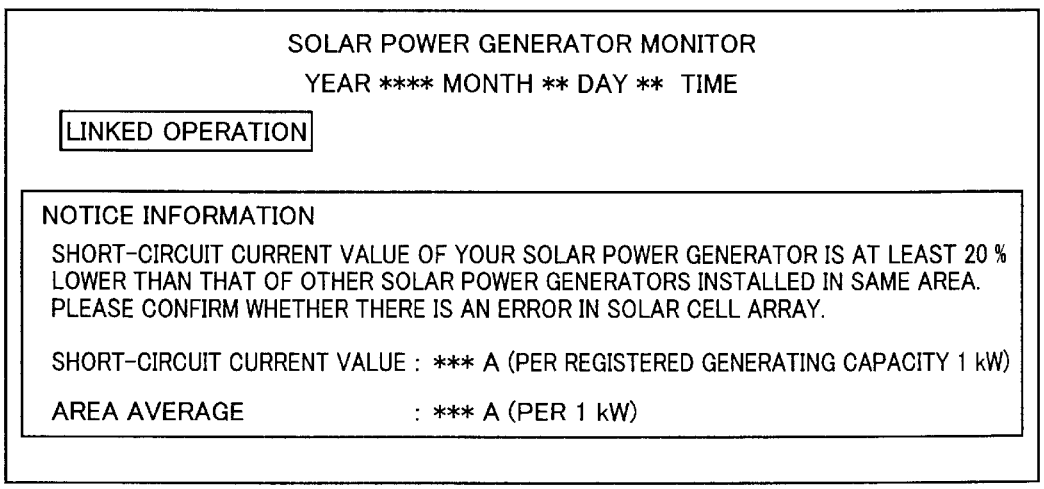

Referring to FIG. 17, upon transmission of the short-circuit current value data to solar power generation administration server 400 (YES at S138), the average value of the short-circuit current value of solar power generator 100 of the same area ID is calculated. The user identified as having a measured short-circuit current value at least 20% below this calculated average value is displayed with notice information recommending confirmation of whether there is an error in solar cell array 110. At the current stage, the measured short-circuit current value and the average value of the short-circuit current value of this area are displayed on display and operation unit 132.

Figure 18:
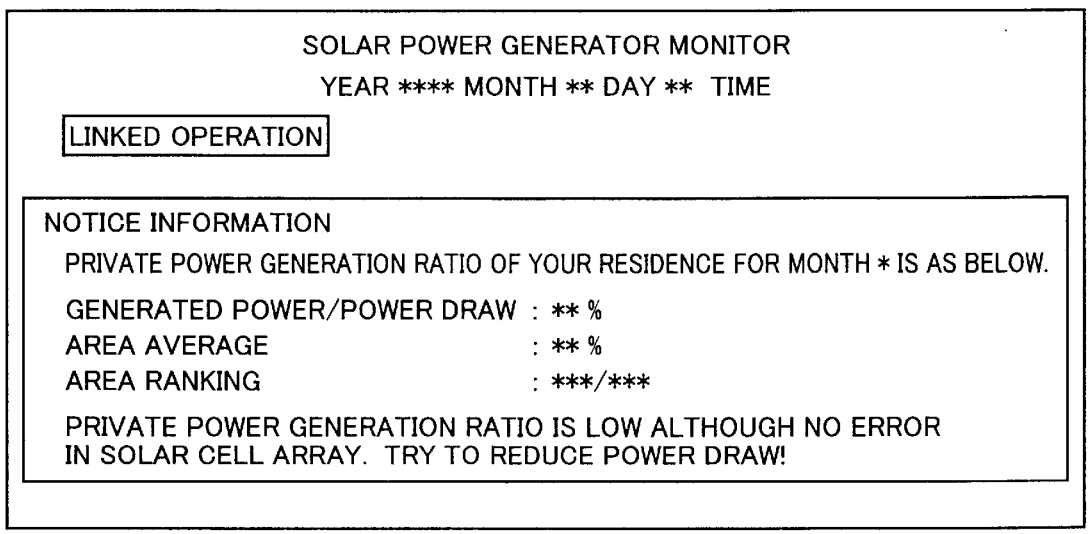

Referring to FIG. 18, notice information associated with the private power generation ratio is displayed upon receiving the month-end final data. Here, the private power generation ratio based on the quantity of generated power and quantity of power draw of one month, the average value of the private power generation ratio of the area with the same area ID, and ranking based on the private power generation ratio of that area are displayed on display and operation unit 132. When the private power generation ratio is low even though there is no error in solar cell array 110 (error in solar cell array 110 as shown in FIGS. 15–17 is not detected), notice information advising to reduce power draw is displayed.

Figure 19:
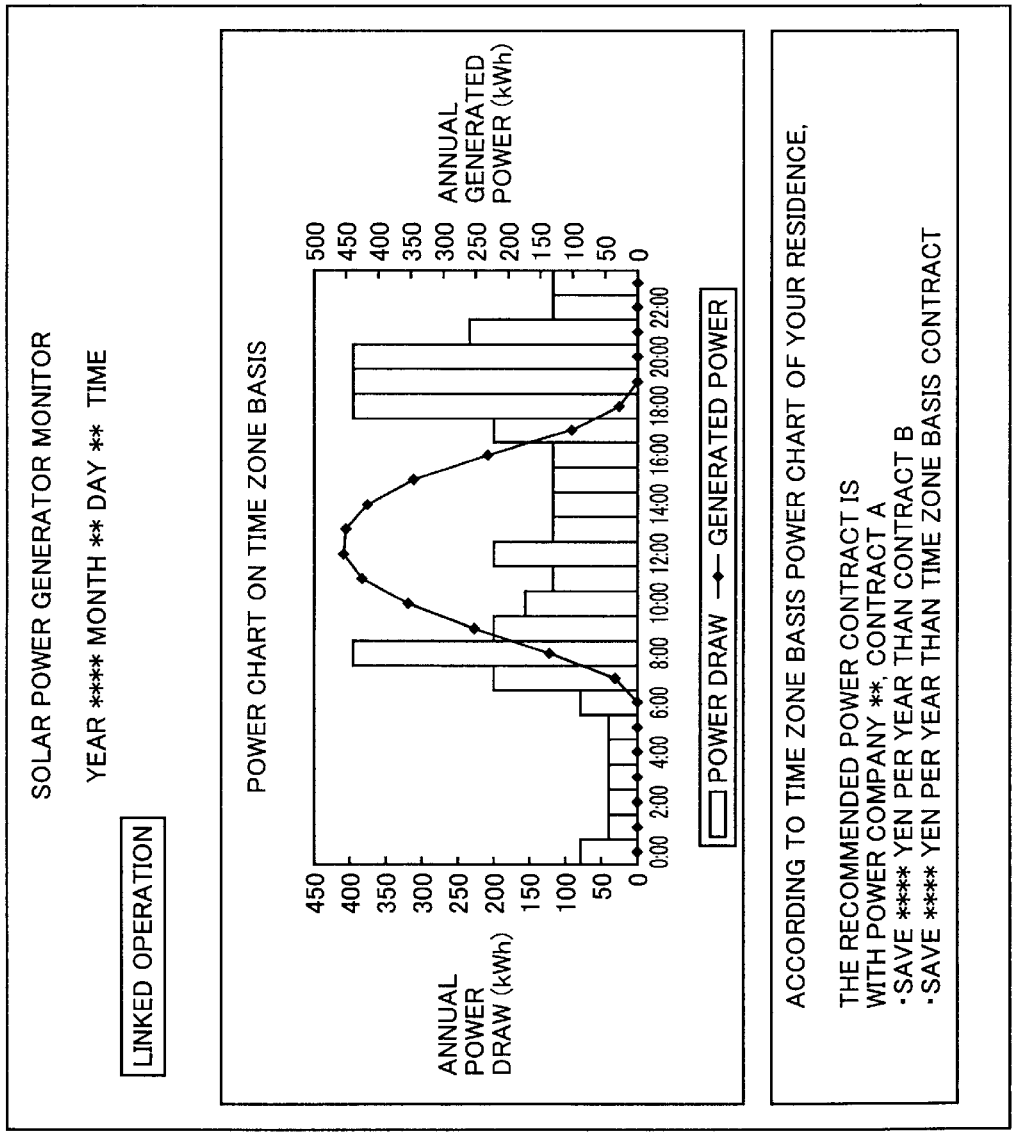
Figure 20:
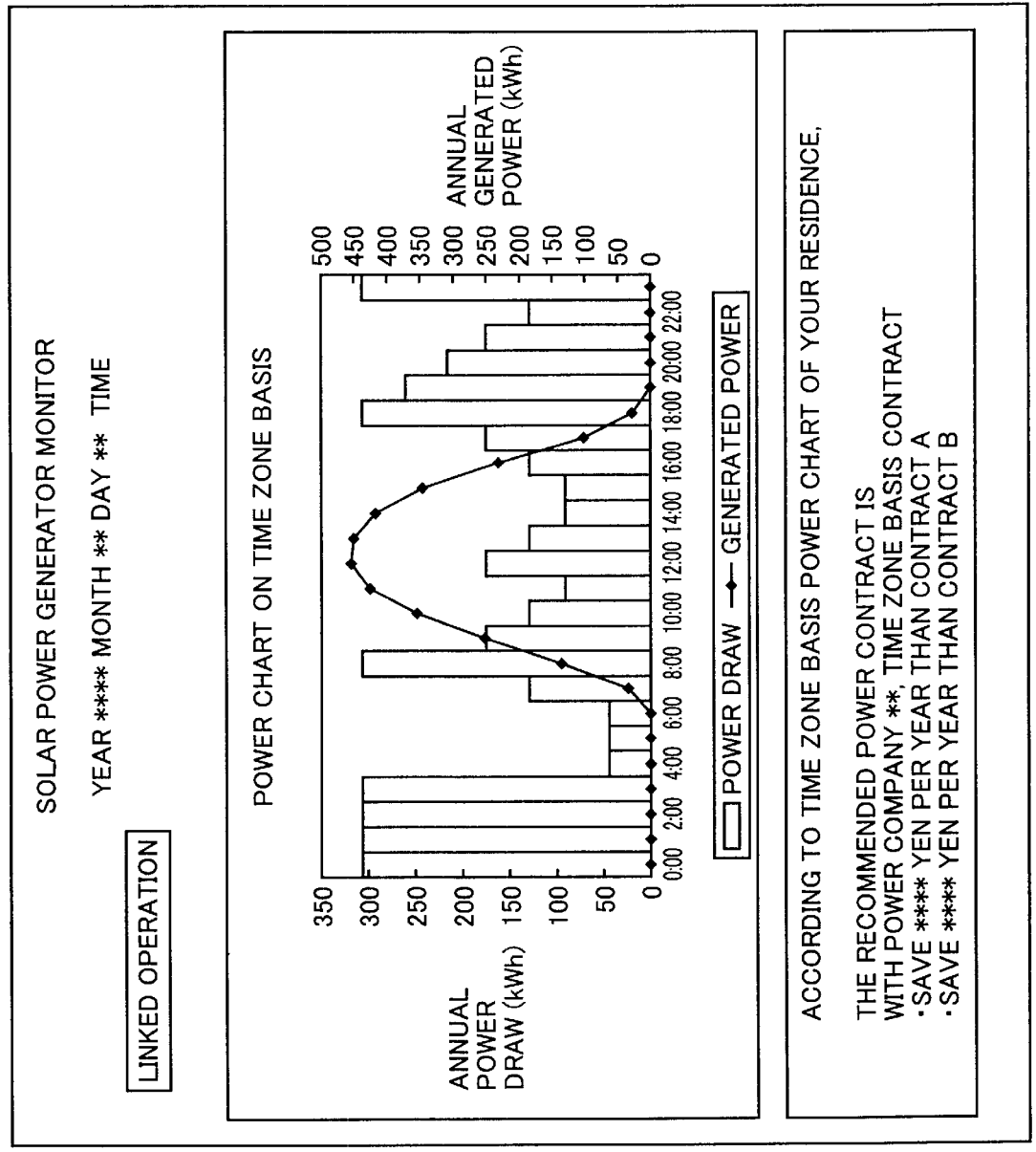
Figure 21:
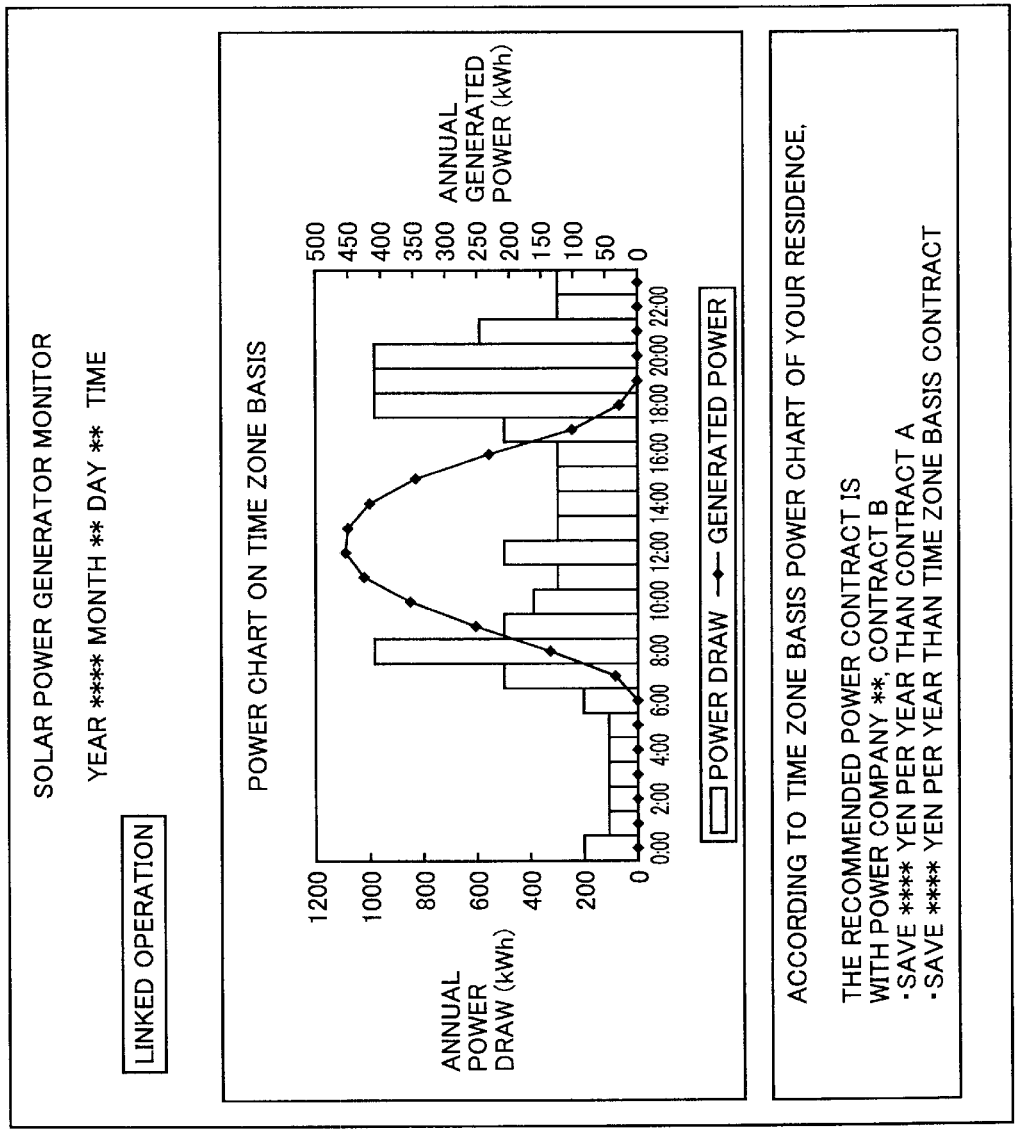

The time zone basis power chart and the like for each user produced by solar power generation administration server 400 upon receiving the month-end final data will be described with reference to FIGS. 19–59. FIGS. 19–21 correspond to examples of display on display and operation unit 132 of solar power generator 100 of three users. FIGS. 22–59 correspond to various data for these three users. Producing a power chart on a time zone basis by calculating annual quantity of power of respective time zones based on the data of the twelve months from January to December, receiving the final data at the end of December, will be described.

As shown in FIG. 19, the time zone basis power chart is produced based on the accumulation of the quantity of consumed power and quantity of generated power for twelve months for respective time zones. Based on such a power chart, the type of contract most advantageous to the user is displayed on display and operation unit 132. For the user of FIG. 19, it is assumed that the power draw is that shown in FIGS. 24 and 25 with respect to the quantity of generated power of solar power generator 100 shown in FIGS. 22 and 23. The quantity of buy power obtained by the difference between the quantity of generated power and quantity of power draw (FIGS. 26 and 27) and the quantity of sell power (FIGS. 28 and 29) are calculated for respective time zones. Then the annual electric power charge to be paid corresponding to respective contract types is calculated.

For example, it is appreciated from FIG. 30 that, according to contract A of power company A, the rate of buy power is the basic rate of 301 Japanese yen up to 15 kWh, 18.48 Japanese yen per 1 kWh when 15–120 kWh, 24.48 Japanese yen per 1 kWh when 120–280 kWh, and 26.79 Japanese yen per 1 kWh when equal to or above 280 kWh. Based on this sell rate table, the calculation of 53,000 Japanese yen is obtained as the electric power charge to be paid to power company A with respect to the buy power of January to December.

It is appreciated from FIG. 31 that, according to contract A of the present user, the unit cost of 24.48 Japanese yen per 1 kWh is applied when 120–280 kWh. The total of the electric power rate to be received from power company A with respect to the sell power of January to December is 43,649 Japanese yen.

The amount of 9,351 yen which is the difference between the amount of 53,000 yen to be paid shown in FIG. 30 and the amount of 43,649 yen to be received shown in FIG. 31 is the annual payment amount when the user enters into contract A with power company A.

It is assumed that the unit cost of buy power and the unit cost of sell power are identical in the contracts with a power company, and the unit cost of the electric power rate of the quantity of buy power for 1 month is applied as the unit cost of the quantity of sell power. More specifically, as shown in FIG. 31, since the quantity of buy power of one month is 274.9 kWh, the unit cost corresponding to 120–280 kWh is applied, so that the unit cost of 1 kWh of the rate of sell power becomes 24.28 yen.

Similarly, the electric power charge from January to December is calculated for contract B that differs in the rate format. The rate of buy power is calculated as 69,831 yen (FIG. 32). The rate of sell power is calculated as 34,948 yen (FIG. 33). As a result, the annual payment amount of the present user when entering into contract B with power company A becomes 34,883 yen.

Furthermore, the electric power charge from January to December is calculated for the time zone basis contract corresponding to the rate format in which the unit cost of 1 kWh from the night hour of 23:00 to 7:00 of the next day is 6.78 yen, which is particularly lower than that of the day time. The rate of buy power is calculated as 64,787 yen (FIG. 34). The rate of sell power is calculated as 48,642 yen (FIG. 35). As a result, the annual amount of payment when entering into contract of the time zone basis with power company A becomes 16,145 yen for this user.

In view of the foregoing calculation, the annual amount to be paid by this user to power company A is 9,351 yen when entering into contract A, 34,883 yen when entering into contract B, and 16,845 yen when entering into a contract on a time zone basis. Thus, notice information recommending contract A corresponding to the lowest amount is displayed. As shown in FIG. 19, notification that the recommended contract is contract A, and the difference in amount from contract B and from the time zone basis contract is displayed on display and operation unit 132.

The above description is based on the comparison of the annual payment for one power company A with respect to a plurality of power trading contracts. In addition, comparison of the annual payment with respect to a plurality of power companies such as power company B and power company C based on respective plurality of power trading contracts may be made. Furthermore, comparison of the payment amount on a monthly basis or on a six-month basis can be effected instead of the annual amount.

FIG. 20 shows the time zone basis power chart of another user. This user consumes a great amount of power during the night time in comparison to the user of FIG. 19. The user of FIG. 20 uses solar cell array 110 identical to that of the user of FIG. 19 at the same area. Therefore, the quantity of generated power of the user of FIG. 20 is as shown in FIGS. 22 and 23, similar to the user of FIG. 19.

FIGS. 36 and 37 show the quantity of power draw of the user of FIG. 20. This user is characterized in that the quantity of power draw is great late at night.

FIGS. 38 and 39 show the quantity of buy power of this user whereas FIGS. 40 and 41 show the quantity of sell power of the same user. The electric power charge with respect to buy power and sell power when this user enters into contract A with power company A is shown in FIGS. 42 and 43, respectively. It is appreciated from FIGS. 42 and 43 that the annual payment of this user to power company A when entering into contract A is 19,318 yen. Similarly, it is appreciated from FIGS. 44 and 45 that the annual payment of this user to power company A when entering into contract B is 42,883 yen. It is also appreciated from FIGS. 46 and 47 that the annual payment of this user to power company A when entering into the contract of the time zone basis becomes 2,786 yen.

Thus, as shown in FIG. 20, notification is made that the recommended contract is the contract on a time zone basis, and the difference in amount from contract A and from contract B is displayed on display and operation unit 132.

FIG. 21 shows the time zone basis power chart of another user. This user consumes a great quantity of power through all the time zones over the year in comparison to the user of FIG. 19. The user of FIG. 21 uses a solar cell array 110 identical to that of the user of FIG. 19 at the same area. Similar to the user of FIG. 19, the quantity of generated power of the user of FIG. 20 is as shown in FIGS. 22 and 23.

FIGS. 48 and 49 show the quantity of power draw of the user of FIG. 20. It is characterized that the quantity of power draw for this user is great over the entire time zones through the year.

FIGS. 50 and 51 show the quantity of buy power of this user whereas FIGS. 52 and 53 show the quantity of buy power of this user. The electric power charge with respect to buy power and sell power when the user enters into contract A with power company A is shown in FIG. 54 and FIG. 55, respectively. It is appreciated from FIGS. 54 and 55 that the annual payment of this user to power company A when entering into contract A is 163,539 yen. Similarly, it is appreciated from FIGS. 56 and 57 that the annual payment of this user to power company A when entering into contract B is 158,944 yen. It is appreciated from FIGS. 58 and 59 that the annual payment of this user to power company A when entering into the contract on the time zone basis is 172,577 yen.

Thus, as shown in FIG. 21, notification that the recommended contract is contract B, and the difference in amount from contract A and from the time zone basis contract is displayed on display and operation unit 132.

According to the solar power generation system of the present embodiment, information from a plurality of solar power generators through the network can be analyzed to produce abnormal detection information as well as producing notice information with respect to the power cost. Reduction in the expense of the user who has installed a solar power generator will promote install of a solar power generator for other users. A solar power generation administration system that can increase the quantity of power generated by solar power generator, which is clean energy, can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solar power generation administration system including a solar power generation administration server and a solar power generator supplying commercial power and solar generated power to a load, wherein said solar power generation administration server comprises a reception circuit receiving data of a quantity of power generated by solar power generation from said solar power generator and a quantity of power draw by said load, a storage circuit connected to said reception circuit to store received data of said quantity of generated power and said quantity of power draw, a production circuit connected to said storage circuit to produce notice information associated with a value to be paid to a power company supplying said commercial power by a user who has installed said solar power generator, based on said quantity of generated power and said quantity of power draw, and a transmission circuit connected to said production circuit to transmit said produced notice information to said solar power generator, wherein said solar power generator comprises a power generation module generating power by sunlight, a measurement circuit connected to said power generation module and said load to measure the quantity of generated power by solar power generation and the quantity of power draw by said load, a transmission circuit connected to said measurement circuit to transmit data of said quantity of generated power and said quantity of power draw to said solar power generation administration server, a reception circuit receiving said notice information from said solar power generation administration server, and an output circuit connected to said reception circuit to output said received notice information.

2. The solar power generation administration system according to claim 1, wherein said measurement circuit comprises a circuit calculating a quantity of generated power by solar power generation, a quantity of power draw by said load, a quantity of sell power to a power company supplying commercial power, and a quantity of buy power from said power company, said transmission circuit of said solar power generator comprises a circuit transmitting data of said quantity of generated power, said quantity of power draw, said quantity of sell power and said quantity of buy power to said solar power generation administration server, said reception circuit of said solar power generation administration server comprises a circuit receiving data of said quantity of generated power, said quantity of power draw, said quantity of sell power and said quantity of buy power from said solar power generator, said production circuit comprises a circuit storing a sell power rate and buy power rate of said power company, and a circuit producing notice information minimizing a value to be paid to said power company by said user who has installed said solar power generator based on said quantity of sell power, said quantity of buy power, said sell power rate and said buy power rate.

3. A solar power generator employed in a solar power generation administration system including a solar power generation administration server and the solar power generator supplying commercial power and solar generated power to a load, said solar power generator comprising:

a power generation module generating power by sunlight, a measurement circuit connected to said power generation module and said load to measure a quantity of generated power by solar power generation and a quantity of power draw by said load, a transmission circuit connected to said measurement circuit to transmit data of said quantity of generated power and said quantity of power draw to said solar power generation administration server, a reception circuit receiving notice information from said solar power generation administration server, and an output circuit connected to said reception circuit to output said received notice information.

4. The solar power generator according to claim 3, said solar power generation administration server including a circuit producing notice information minimizing a value to be paid to said power company by a user who has installed said solar power generator, based on data of said quantity of generated power, said quantity of power draw, a quantity of buy power and a quantity of buy power received from said solar power generator, and prestored sell power and buy power rates, wherein said measurement circuit comprises a circuit measuring a quantity of generated power by solar power generation, a quantity of power draw by said load, a quantity of sell power to a power company supplying commercial power, and a quantity of buy power from said power company, wherein said transmission circuit comprises a circuit transmitting data of said quantity of generated power, said quantity of power draw, said quantity of sell power and said quantity of buy power to said solar power generation administration server.

5. A solar power generator supplying commercial power and solar generated power to a load, comprising:

a power generation module generating power by sunlight, a measurement circuit connected to said power generation module and said load to measure a quantity of generated power by solar power generation, a quantity of power draw by said load, a quantity of sell power to a power company supplying commercial power, and a quantity of buy power from said power company, a rate storage circuit storing a sell power rate and buy power rate of said power company, a production circuit connected to said measurement circuit and said rate storage circuit to produce notice information minimizing a value to be paid to said power company by a user who has installed said solar power generator based on said quantity of sell power, said quantity of buy power, said sell power rate and said buy power rate, and an output circuit connected to said production circuit to output said produced notice information.

6. A solar power generation administration server employed in a solar power generation administration system including the solar power generation administration server and a solar power generator supplying commercial value and solar generated power to a load, said solar power generation administration server comprising:

a reception circuit receiving data of a quantity of generated power by solar power generation and a quantity of power draw by said load, a production circuit connected to said reception circuit to produce notice information associated with a value to be paid to a power company supplying said commercial power by a user who has installed said solar power generator, based on said quantity of generated power and said quantity of power draw, and a transmission circuit connected to said production circuit to transmit said produced notice information to said solar power generator.

7. The solar power generation administration server according to claim 6, said solar power generator including a circuit measuring said quantity of generated power, said quantity of power draw, a quantity of sell power to a power company supplying commercial power, and a quantity of buy power from said power company, and a circuit transmitting data of said quantity of generated power, said quantity of power draw, said quantity of sell power and said quantity of buy power to said solar power generation administration server, wherein said reception circuit comprises a circuit receiving data of said quantity of generated power, said quantity of power draw, said quantity of sell power and said quantity of buy power from said solar power generator, and wherein said production circuit comprises a circuit storing a sell power rate and a buy power rate of said power company, and a circuit producing notice information minimizing a value to be paid to said power company by a user who has installed said solar power generator based on said quantity of sell power, said quantity of buy power, said sell power rate and said buy power rate.

8. The solar power generation administration server according to claim 7, wherein said production circuit comprises a circuit storing a sell power rate and a buy power rate of a plurality of power companies, a circuit selecting a power company from said plurality of power companies that minimizes a value to be paid to the power company by the user who has installed said solar power generator, and a circuit producing said notice information.

9. The solar power generation administration server according to claim 6, said solar power generation administration server being connected to a plurality of said solar power generators, wherein
- said reception circuit comprises a circuit receiving information representing an area where a solar power generator is installed, a quantity of generated power by solar power generation, and a quantity of power draw by said load,
- said production circuit comprises a circuit calculating an average value of the quantity of generated power by said solar power generator installed at an area assumed to have the same hours of sunlight based on the quantity of generated power of said plurality of solar power generators, and a circuit producing notice information notifying occurrence of an error in a solar power generator whose quantity of generated power is below said average value,
- said transmission circuit comprises a circuit transmitting said produced notice information to the solar power generator whose quantity of generated power is below said average value.

10. The solar power generation administration server according to claim 6, further comprising a storage circuit prestoring a duration of sunshine for each area and time zone, and a calculable quantity of generating power calculated based on said duration of sunlight, wherein
- said reception circuit comprises a circuit receiving area data representing an area where a solar power generator is installed, a quantity of generated power by solar power generation, a quantity of power draw by said load, and time zone data representing a measured time zone of said quantity of generated power,
- said production circuit comprises a circuit connected to said storage circuit to produce notice information notifying occurrence of an error in a solar power generator whose quantity of generated power is below said calculable quantity of generating power, based on a calculable quantity of generating power generated based on said received area data and time zone data, and said received data of the quantity of generated power, and
- said transmission circuit comprises a circuit transmitting said produced notice information to a solar power generator whose quantity of generated power is below said calculable quantity of generating power.

11. The solar power generation administration server according to claim 6, wherein said production circuit includes a circuit connected to said storage circuit to produce a ratio of said quantity of generated power to said quantity of power draw as said notice information based on a quantity of generated power by said solar power generator and a quantity of power draw.

12. The solar power generation administration server according to claim 6, said solar power generation administration server being connected to a plurality of said solar power generators,
- wherein said production circuit comprises a circuit calculating an average value of a ratio of said quantity of generated power to said quantity of power draw based on the quantity of generated power by said plurality of solar power generators and the quantity of power draw, and a circuit producing information of comparison between said calculated average value of ratio and said ratio of each said solar power generator as said notice information.

13. The solar power generation administration server according to claim 12, wherein said notice information includes information representing a list of users installing said plurality of solar power generators in a descending order of said ratio.

14. The solar power generation administration server according to claim 6, said solar power generation administration server being connected to a plurality of said solar power generators, said solar power generator including a circuit measuring a value of a short-circuit current of a power generation module and transmitting the measured value to said solar power generator, wherein
- said reception circuit comprises a circuit receiving information representing an area where a solar power generator is installed, and said short-circuit current value,
- said production circuit comprises a circuit calculating an average value of said short-circuit current value of said solar power generator installed in an area assumed to have the same duration of sunlight based on the short-circuit current value of a plurality of solar power generators, and a circuit producing notice information notifying occurrence of an error in a solar power generator including a power generation module whose short-circuit current value is below said average value,
- said transmission circuit includes a circuit transmitting said produced notice information to the solar power generator whose short-circuit current value is below said average value.

15. A solar power generation administration system including a solar power generation administration server, and a solar power generator supplying commercial power and solar generated power to a load,
- wherein said solar power generation administration server comprises
- reception means for receiving data of a quantity of generated power by solar power generation from said solar power generator and a quantity of power draw by said load,
- storage means connected to said reception means for storing received data of said quantity of generated power and said quantity of power draw,
- production means connected to said storage means for producing notice information associated with a value to be paid to a power company supplying said commercial power by a user who has installed said solar power generator, based on said quantity of generated power and said quantity of power draw, and
- transmission means connected to said production means for transmitting said produced notice information to said solar power generator,
- wherein said solar power generator comprises
- a power generation module generating power by sunlight,
- measurement means connected to said power generation module and said load for measuring a quantity of generated power by solar power generation and a quantity of power draw by said load,
- transmission means connected to said measurement means for transmitting data of said quantity of generated power and said power draw to said solar power generation administration server, reception means for receiving said notice information from said solar power generation administration server, and output means connected to said reception means for providing said received notice information.

16. The solar power generation administration system according to claim 15, wherein
said measurement means comprises means for calculating a quantity of generated power by solar power generation, a quantity of power draw by said load, a quantity of sell power to a power company supplying commercial power, and a quantity of buy power from said power company, said transmission means of said solar power generator comprises means for transmitting data of said quantity of generated power, said quantity of power draw, said quantity of sell power and said quantity of buy power to said solar power generation administration server, said reception means of said solar power generation administration server comprises means for receiving data of said quantity of generated power, said quantity of draw power, said quantity of sell power and said quantity of buy power from said solar power generator, and said production means comprises means for storing a sell power rate and buy power rate of said power company, and means for producing notice information minimizing a value to be paid to said power company by a user who has installed said solar power generator based on said quantity of sell power, said quantity of buy power, said sell power rate and said buy power rate.

17. A solar power generator employed in a solar power generation administration system including a solar power generation administration server and the solar power generator supplying commercial power and solar generated power to a load, said solar power generator comprising:
a power generation module generating power by sunlight,
measurement means connected to said power generation module and said load for measuring a quantity of generated power by solar power generation and a quantity of power draw by said load,
transmission means connected to said measurement means for transmitting data of said quantity of generated power and said quantity of draw power to said solar power generation administration server,
reception means for receiving notice information from said solar power generation administration server, and
output means connected to said reception means for providing said received notice information.

18. The solar power generator according to claim 17, said solar power generation administration server including means for producing notice information minimizing a value to be paid to said power company by a user who has installed said solar power generator based on data of said quantity of generated power, said quantity of power draw, a quantity of sell power and a quantity of buy power received from said solar power generator, and prestored sell power and buy power rates,
wherein said measurement means comprises means for measuring a quantity of generated power by solar power generation, a quantity of power draw by said load, a quantity of sell power to a power company supplying commercial power, and a quantity of buy power from said company,
wherein said transmission means comprises means for transmitting data of said quantity of generated power, said quantity of power draw, said quantity of sell power and said quantity of buy power to said solar power generation administration server.

19. A solar power generator supplying commercial power and solar generated power to a load, comprising:
a power generation module generating power by sunlight,
measurement means connected to said power generation module and said load for measuring a quantity of generated power by solar power generation, a quantity of power draw by said load, a quantity of sell power to a power company supplying commercial power, and a quantity of buy power from said power company,
rate storage means for storing a sell power rate and buy power rate of said power company,
production means connected to said measurement means and said rate storage means for producing notice information minimizing a value to be paid to said power company by a user who has installed said solar power generator, based on said quantity of sell power, said quantity of buy power, said sell power rate and said buy power rate, and
output means connected to said production means for providing said produced notice information.

20. A solar power generation administration server employed in a solar power generation administration system including the solar power generation administration server and a solar power generator supplying commercial power and solar generated power to a load, said solar power generation administration server comprising:
reception means for receiving data of a quantity of generated power by solar power generation and a quantity of power draw by said load,
production means connected to said reception means for producing notice information associated with a value to be paid to a power company supplying said commercial power by a user who has installed said solar power generator based on said quantity of generated power and said quantity of power draw, and
transmission means connected to said production means for transmitting said produced notice information to said solar power generator.

21. The solar power generation administration server according to claim 20, said solar power generator including means for measuring said quantity of generated power, said quantity of power draw, a quantity of sell power to a power company supplying commercial power and a quantity of buy power from said power company, and means for transmitting data of said quantity of generated power, said quantity of power draw, said quantity of sell power and said quantity of buy power to said solar power generation administration server,
wherein said reception means comprises means for receiving data of said quantity of generated power, said quantity of power draw, said quantity of sell power and said quantity of buy power from said solar power generator, and
wherein said production means comprises means for storing a sell power rate and buy power rate of said power company, and means for producing notice information minimizing a value to be paid to said power company by the user who has installed said solar power generator, based on said quantity of sell power, said quantity of buy power, said sell power rate and said buy power rate.

22. The solar power generation administration server according to claim 21, wherein said production means comprises means for storing a sell power rate and buy power rate of a plurality of power companies, means for selecting a power company from said plurality of power companies that minimizes a value to be paid to the power company by the user who has installed said solar power generator, and means for producing said notice information.

23. The solar power generation administration server according to claim 20, being connected to a plurality of said solar power generators, wherein said reception means comprises means for receiving information representing an area where a solar power generator is installed, a quantity of generated power by solar power generation, and a quantity of power draw by said load, said production means comprises means for calculating an average value of the quantity of generated power by said solar power generator installed at an area assumed to have the same duration of sunlight based on the quantity of generated power of said plurality of solar power generators, and means for producing notice information notifying occurrence of an error in a solar power generator whose quantity of generated power is below said average power, and said transmission means comprises means for transmitting said produced notice information to the solar power generator whose quantity of generated power is below said average value.

24. The solar power generation administration server according to claim 20, further comprising storage means for prestoring a duration of sunlight for every area and every time zone, and a calculable quantity of generating power calculated based on said duration of sunlight, wherein said reception means comprises means for receiving area data representing an area where a solar power generator is installed, a quantity of generated power by solar power generation, a quantity of power draw by said load, and time zone data representing a measured time zone of said quantity of generated power, said production means comprises means connected to said storage means for producing notice information notifying occurrence of an error in a solar power generator whose quantity of generated power is below said calculable quantity of generating power based on a calculable quantity of generating power calculated based on the received area data and time zone data, and received data of the quantity of generated power, and said transmission means comprises means for transmitting said produced notice information to a solar power generator whose quantity of generated power is below said calculable quantity of generating power.

25. The solar power generation administration server according to claim 20, wherein said production means comprises means connected to said storage means for producing a ratio of said quantity of generated power to said quantity of power draw as said notice information, based on the quantity of generated power and the quantity of power draw of said solar power generator.

26. The solar power generation administration server according to claim 20, being connected to a plurality of said solar power generators, wherein said production means comprises means for calculating an average value of a ratio of said quantity of generated power to said quantity of power draw based on the quantity of generated power by said plurality of solar power generators and quantity of power draw, and means for producing information of comparison between said calculated average value and said ratio of each said solar power generator as said notice information.

27. The solar power generation administration server according to claim 26, wherein said notice information includes information representing a list of users installing said plurality of solar power generators in a descending order of said ratio.

28. The solar power generation administration server according to claim 20, being connected to a plurality of said solar power generator, said solar power generator including means for measuring a value of short-circuit current of a power modulation module and transmitting the measured value to said solar power generator, wherein said reception means comprises means for receiving information representing an area where a solar power generator is installed and said short-circuit current value, said production means comprises means for calculating an average value of said short-circuit current value of a solar power generator installed at an area assumed to have the same duration of sunlight based on the short-circuit current value of said plurality of solar power generators, and means for producing notice information notifying occurrence of an error in a solar power generator including a power generation module whose short-circuit current value is below said average value, and said transmission means comprises means for transmitting said produced notice information to the solar power generator including a power generation module whose short-circuit current value is below said average.

29. A solar power generation administration method in a solar power generation administration server employed in a solar power generation administration system including the solar power generation administration server and a solar power generator supplying commercial value and solar generated power to a load, said method comprising the steps of:

receiving data of a quantity of generated power by solar power generation and a quantity of power draw by said load from said solar power generator, producing notice information associated with a value to be paid to a power company supplying said commercial power by a user who has installed said solar power generator, based on received data of said quantity of generated power and said quantity of power draw, and transmitting said produced notice information to said solar power generator.

30. The solar power generation administration method according to claim 29, said solar power generator including a circuit measuring said quantity of generated power, said quantity of power draw, a quantity of sell power to a power company supplying commercial power, and a quantity of buy power from said power company, and a circuit transmitting data of said quantity of generated power, said quantity of power draw, said quantity of sell power and said quantity of buy power to said solar power generation administration server, wherein said step of receiving a quantity of generated power and a quantity of power draw comprises the step of receiving data of said quantity of generated power, said quantity of power draw, said quantity of sell power and said quantity of buy power from said solar power generator, said step of producing notice information comprises the steps of preparing information of a sell power rate and buy power rate of said power company, and producing notice information minimizing a value to be paid to said power company by the user who has installed said solar power generator based on said quantity of sell power, said quantity of buy power, said sell power rate and said buy power rate.

31. The solar power generation administration method according to claim 30, wherein said step of producing notice information comprises the steps of preparing information of a sell power rate and buy power rate of a plurality of power companies, selecting a power company from said plurality of power companies that minimizes a value to be paid to the power company by the user who has installed said solar power generator, and producing said notice information.

32. The solar power generation administration method according to claim 29, said solar power generation administration server being connected to a plurality of said solar power generators, wherein said step of receiving said quantity of generated power and quantity of power draw comprises the step of receiving information representing an area where a solar power generator is installed, a quantity of generated power by solar power generation, and a quantity of power draw by said load, said step of producing notice information comprises the steps of calculating an average value of the quantity of generated power by said solar power generator installed in an area assumed to have the same duration of sunlight based on the quantity of generated power of said plurality of solar power generators, and producing notice information notifying occurrence of an error in a solar power generator whose quantity of generated power is below said average value, and said step of transmitting notice information comprises the step of transmitting said produced notice information to the solar power generator whose quantity of generated power is below said average value.

33. The solar power generation administration method according to claim 29, further comprising the step of preparing information of a duration of sunlight for every area and every time zone, and a calculable quantity of generating power calculated based on said duration of sunlight, wherein said step of receiving a quantity of generated power and a quantity of power draw comprises the step of receiving area data representing an area where a solar power generator is installed, a quantity of generated power by solar power generation, a quantity of power draw by said load, and time zone data representing a measured time zone of said quantity of generated power, said step of producing notice information comprises the step of producing notice information notifying occurrence of an error in a solar power generator whose quantity of generated power is below said calculable quantity of generating power based on a calculable quantity of generating power calculated based on the received area data and time zone data, and the received quantity of generated power, and said step of transmitting notice information comprises the step of transmitting said produced notice information to a solar power generator whose quantity of generated power is below said calculable quantity of generating power.

34. The solar power generation administration method according to claim 29, wherein said step of producing notice information comprises the step of producing a ratio of said quantity of generated power to said quantity of power draw as said notice information based on the quantity of generated power by said solar power generator and the quantity of power draw.

35. The solar power generation administration method according to claim 29, said solar power generation administration server being connected to a plurality of said solar power generators, wherein said step of producing notice information comprises the steps of calculating an average value of a ratio of said quantity of generated power to said quantity of power draw based on the quantity of generated power by said plurality of solar power generators and the quantity of power draw, and producing information of comparison between said calculated average value and said ratio of each said solar power generator as said notice information.

36. The solar power generation administration method according to claim 35, wherein said notice information includes information representing a list of users installing said plurality of solar power generators in a descending order of said ratio.

37. The solar power generation administration method according to claim 29, said solar power generation administration server being connected to a plurality of said solar power generators, and said solar power generator including a circuit measuring a value of a short-circuit current of a power generation module and transmitting the measured value to said solar power generator, wherein said step of receiving a quantity of generated power and a quantity of power draw comprises the step of receiving information representing an area where a solar power generator is installed and said short-circuit current value, said step of producing notice information comprises the steps of calculating an average value of said short-circuit current value of a solar power generator installed at an area assumed to have the same duration of sunlight based on the short-circuit current value of said plurality of solar power generators, and producing notice information notifying occurrence of an error in a solar power generator including a power generation module whose short-circuit current value is below said average value, said step of transmitting notice information comprises the step of transmitting said produced notice information to a solar power generator including a power generation module whose short-circuit current value is below said average value.

38. A computer readable recording medium recorded with a program realizing a solar power generation administration method in a solar power generation administration server employed in a solar power generation administration system including the solar power generation administration server and a solar power generator supplying commercial power and solar generated power to a load, said method comprising the steps of:

receiving data of a quantity of generated power by solar power generation and a quantity of power draw by said load from said solar power generator, producing data of notice information associated with a value to be paid to a power company supplying said commercial power by a user who has installed said solar power generator, based on received data of said quantity of generated power and said quantity of power draw, and transmitting said produced notice information to said solar power generator.

39. The recording medium according to claim 38, said solar power generator including a circuit measuring said quantity of generated power, said quantity of power draw, a quantity of sell power to a power company supplying commercial power, and a quantity of buy power from said power company, and a circuit transmitting data of said quantity of generated power, said quantity of power draw, said quantity of sell power and said quantity of buy power to said solar power generation administration server, wherein said step of receiving a quantity of generated power and a quantity of power draw comprises the step of receiving data of said quantity of generated power, said quantity of power draw, said quantity of sell power and said quantity of buy power from said solar power generator, said step of producing notice information comprises the steps of preparing information of a sell power rate and buy power rate of said power company, and producing notice information minimizing a value to be paid to said power company by the user who has installed said solar power generator based on said quantity of sell power, said quantity of buy power, said sell power rate and said buy power rate.

40. The recording medium according to claim 39, wherein said step of producing notice information comprises the steps of preparing information of a sell power rate and buy power rate of a plurality of power companies, selecting a power company from said plurality of power companies that minimizes a value to be paid to the power company by the user who has installed said solar power generator, and producing said notice information.

41. The recording medium according to claim 38, said solar power generation administration server being connected to a plurality of said solar power generators, wherein said step of receiving said quantity of generated power and quantity of power draw comprises the step of receiving information representing an area where a solar power generator is installed, a quantity of generated power by solar power generation, and a quantity of power draw by said load, said step of producing notice information comprises the steps of calculating an average value of the quantity of generated power by said solar power generator installed in an area assumed to have the same duration of sunlight based on the quantity of generated power of said plurality of solar power generators, and producing notice information notifying occurrence of an error in a solar power generator whose quantity of generated power is below said average value, and said step of transmitting notice information comprises the step of transmitting said produced notice information to the solar power generator whose quantity of generated power is below said average value.

42. The recording medium according to claim 38, further comprising the step of preparing information of a duration of sunlight for every area and every time zone, and a calculable quantity of generating power calculated based on said duration of sunlight, wherein said step of receiving a quantity of generated power and a quantity of power draw comprises the step of receiving area data representing an area where a solar power generator is installed, a quantity of generated power by solar power generation, a quantity of power draw by said load, and time zone data representing a measured time zone of said quantity of generated power, said step of producing notice information comprises the step of producing notice information notifying occurrence of an error in a solar power generator whose quantity of generated power is below said calculable quantity of generating power based on a calculable quantity of generated power calculated based on the received area data and time zone data, and the received quantity of generated power, and said step of transmitting notice information comprises the step of transmitting said produced notice information to a solar power generator whose quantity of generated power is below said calculable quantity of generating power.

43. The recording medium according to claim 38, wherein said step of producing notice information comprises the step of producing a ratio of said quantity of generated power to said quantity of power draw as said notice information based on the quantity of generated power by said solar power generator and the quantity of power draw.

44. The recording medium according to claim 38, said solar power generation administration server being connected to a plurality of said solar power generators, wherein said step of producing notice information comprises the steps of calculating an average value of the ratio of said quantity of generated power to said quantity of power draw based on the quantity of generated power and quantity of power draw of said plurality of solar power generators, and producing information of comparison between said calculated average value and said ratio of each said solar power generator as said notice information.

45. The recording medium according to claim 44, wherein said notice information includes information representing a list of users installing said plurality of solar power generators in a descending order of said ratio.

46. The recording medium according to claim 38, said solar power generation administration server being connected to a plurality of said solar power generators, and said solar power generator including a circuit measuring a value of a short-circuit current of a power generation module and transmitting the measured value to said solar power generator, wherein said step of receiving a quantity of generated power and a quantity of power draw comprises the step of receiving information representing an area where a solar power generator is installed and said short-circuit current value, said step of producing notice information comprises the steps of calculating an average value of said short-circuit current value of a solar power generator installed at an area assumed to have the same duration of sunlight based on the short-circuit current value of said plurality of solar power generators, and producing notice information notifying occurrence of an error in a solar power generator including a power generation module whose short-circuit current value is below said average value, said step of transmitting notice information comprises the step of transmitting said produced information to a solar power generator including a power generation module whose short-circuit current value is below said average value.

* * * * *